United States Patent
Kim et al.

(10) Patent No.: US 12,063,174 B2
(45) Date of Patent: Aug. 13, 2024

(54) METHOD FOR TRANSMITTING OR RECEIVING PHYSICAL DOWNLINK SHARED CHANNEL IN WIRELESS COMMUNICATION SYSTEM AND DEVICE THEREFOR

(71) Applicant: LG ELECTRONICS INC., Seoul (KR)

(72) Inventors: Kyuseok Kim, Seoul (KR); Hyungtae Kim, Seoul (KR); Jiwon Kang, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 352 days.

(21) Appl. No.: 17/608,331

(22) PCT Filed: May 4, 2020

(86) PCT No.: PCT/KR2020/005864
§ 371 (c)(1),
(2) Date: Nov. 2, 2021

(87) PCT Pub. No.: WO2020/222601
PCT Pub. Date: Nov. 5, 2020

(65) Prior Publication Data
US 2022/0224472 A1 Jul. 14, 2022

(30) Foreign Application Priority Data

May 2, 2019 (KR) .................. 10-2019-0051873
May 10, 2019 (KR) .................. 10-2019-0055307
Oct. 4, 2019 (KR) .................. 10-2019-0123436

(51) Int. Cl.
*H04L 5/00* (2006.01)
*H04W 72/23* (2023.01)

(52) U.S. Cl.
CPC .......... *H04L 5/0048* (2013.01); *H04L 5/0035* (2013.01); *H04W 72/23* (2023.01)

(58) Field of Classification Search
CPC ... H04L 5/0048; H04L 5/0035; H04L 5/0051; H04L 1/00; H04L 5/0053; H04L 25/03;
(Continued)

(56) References Cited

U.S. PATENT DOCUMENTS

2020/0015200 A1* 1/2020 Vilaipornsawai ..... H04W 72/23
2020/0177416 A1* 6/2020 Jiang .................... H04B 7/0626
(Continued)

FOREIGN PATENT DOCUMENTS

EP 3451553 3/2019
WO 2018/217063 11/2018

OTHER PUBLICATIONS

LG Electronics, "Discussion on DMRS port indication for NCJT," R1-1902098, 3GPP TSG RAN WG1 #96, Athens, Greece, Feb. 25-Mar. 1, 2019, 9 pages.
(Continued)

*Primary Examiner* — Kibrom T Hailu
(74) *Attorney, Agent, or Firm* — Fish & Richardson P.C.

(57) ABSTRACT

A method for receiving a physical downlink shared channel (PDSCH) by a user equipment (UE) in a wireless communication system is disclosed, the method according to an embodiment of the present disclosure comprising: receiving downlink control information (DCI); wherein the DCI includes i) a transmission configuration indication (TCI) field and ii) an antenna port field; and receiving the PDSCH scheduled based on the DCI, wherein a plurality of TCI states are indicated based on the TCI field, and demodulation reference signal (DM-RS) ports of a plurality of code division multiplexing (CDM) groups are indicated based on the antenna port field, and wherein a first TCI state among
(Continued)

the plurality of TCI states corresponds to a CDM group including a first DM-RS port based on an instruction order of the DM-RS ports.

9 Claims, 14 Drawing Sheets

(58) Field of Classification Search
CPC .... H04L 5/0094; H04W 72/23; H04W 72/20; H04W 72/535; H04B 7/0408; H04B 7/06; H04B 17/373; H04B 7/0626
See application file for complete search history.

(56) References Cited

U.S. PATENT DOCUMENTS

| | | | |
|---|---|---|---|
| 2021/0014021 A1* | 1/2021 | Hunukumbure | H04L 5/0053 |
| 2021/0091902 A1* | 3/2021 | Yamada | H04W 16/28 |
| 2021/0337548 A1* | 10/2021 | Gao | H04W 72/0446 |
| 2022/0124751 A1* | 4/2022 | Matsumura | H04B 7/024 |

OTHER PUBLICATIONS

CATT, "Draft CR on DMRS transmission," R1-1905104, 3GPP TSG RAN WG1 Meeting #96bis, Xi'an, China, Apr. 8-12, 2019, 3 pages.
Ericsson, "On multi-TRP and multi-panel," R1-1905513, 3GPP TSG RAN WG1 Meeting RAN1#96-bis, Xi'an, China, Apr. 8-12, 2019, 19 pages.
PCT International Search Report for International Application No. PCT/KR2020/005864, mailed Aug. 24, 2020, 5 pages.

* cited by examiner

[FIG. 1]
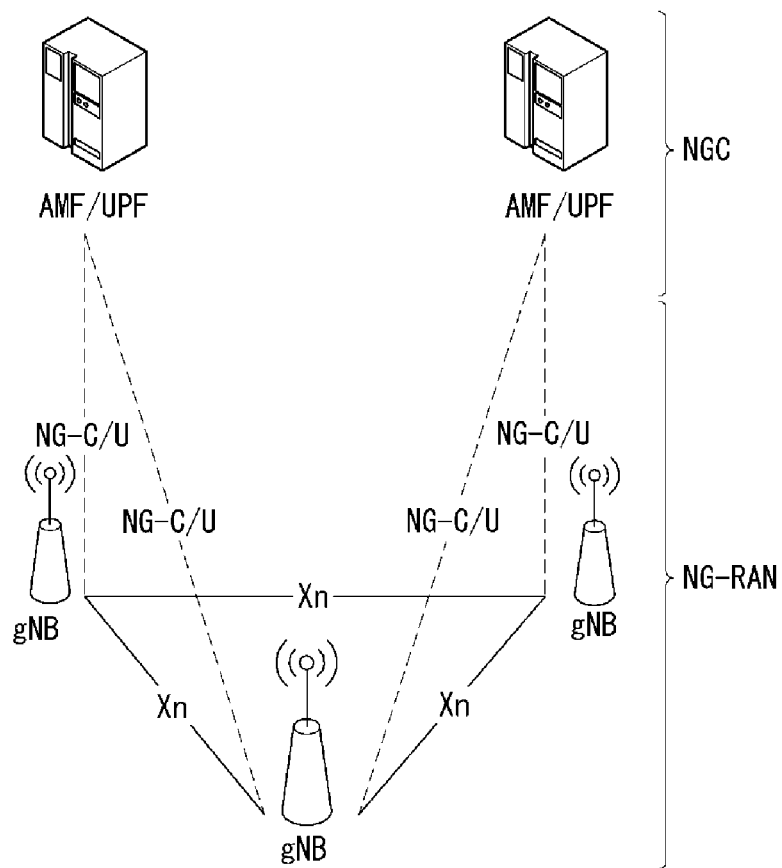
[FIG. 2]
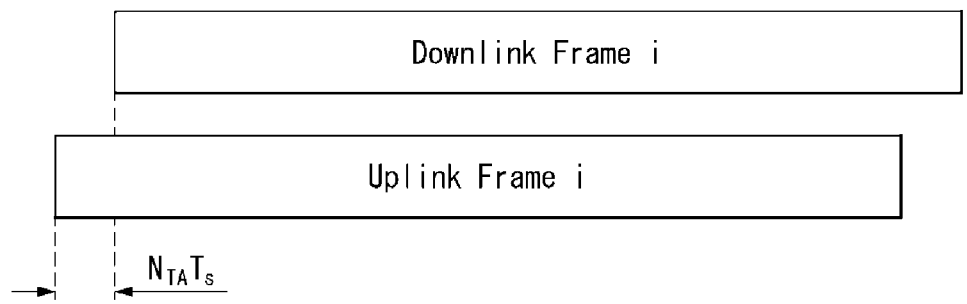

[FIG. 3]
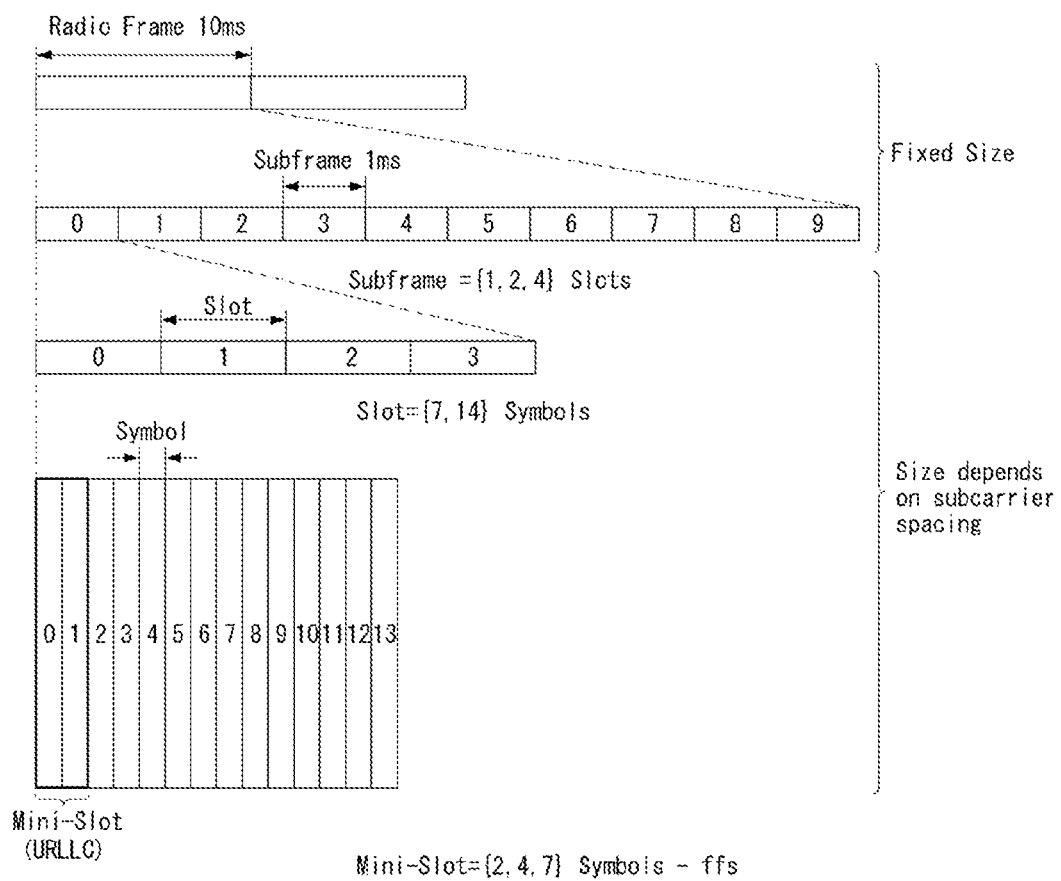

[FIG. 4]
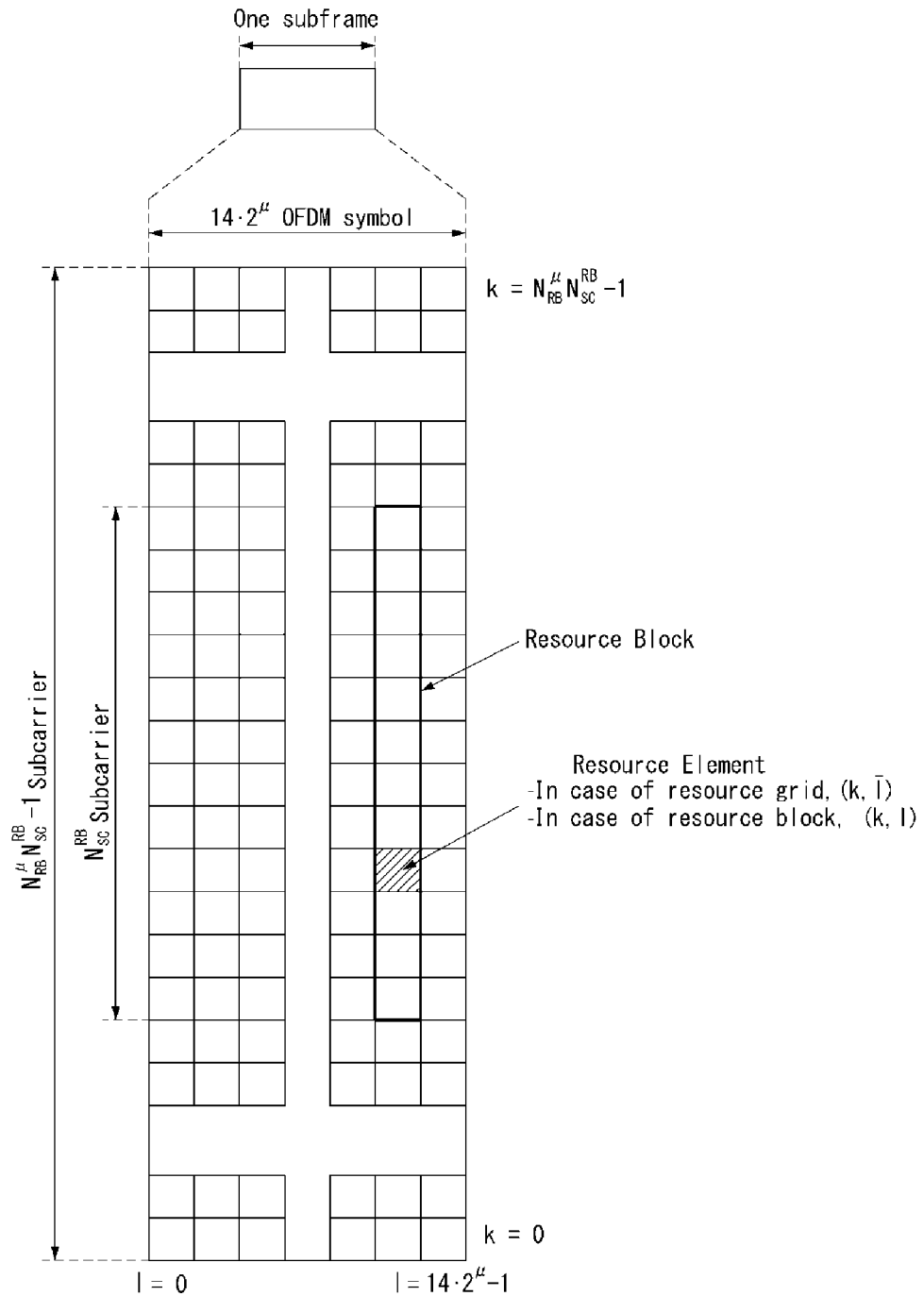

[FIG. 5]
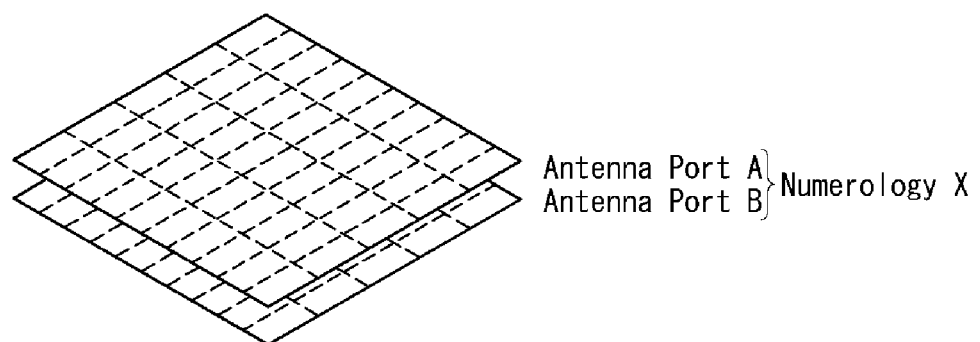
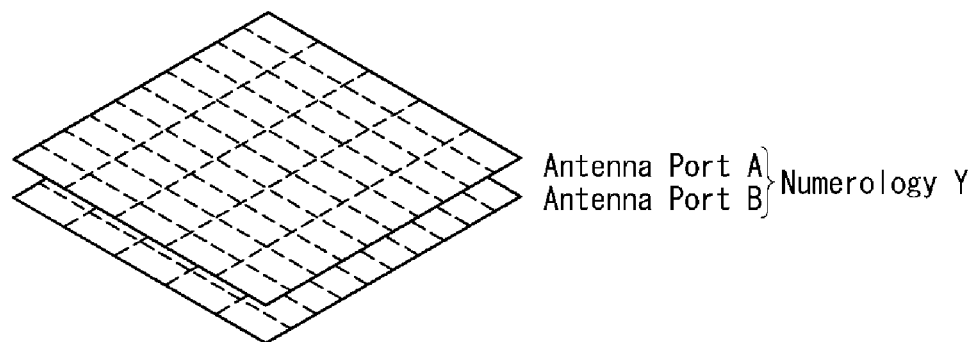

[FIG. 6]
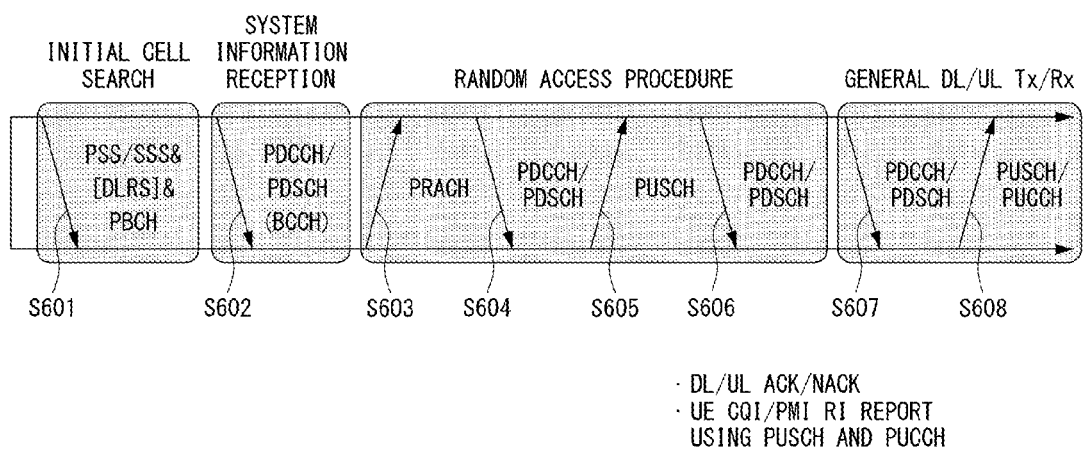
[FIG. 7]
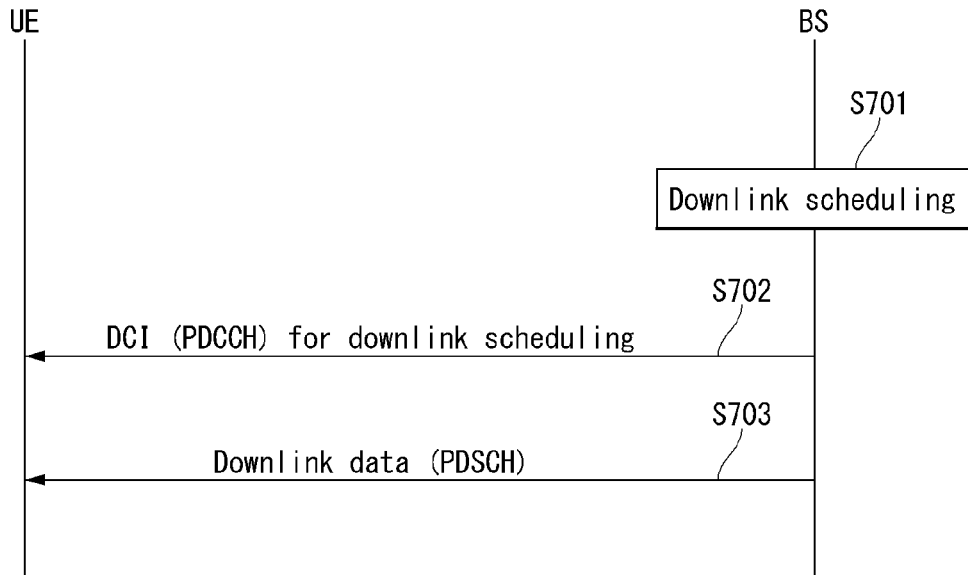

[FIG. 8]
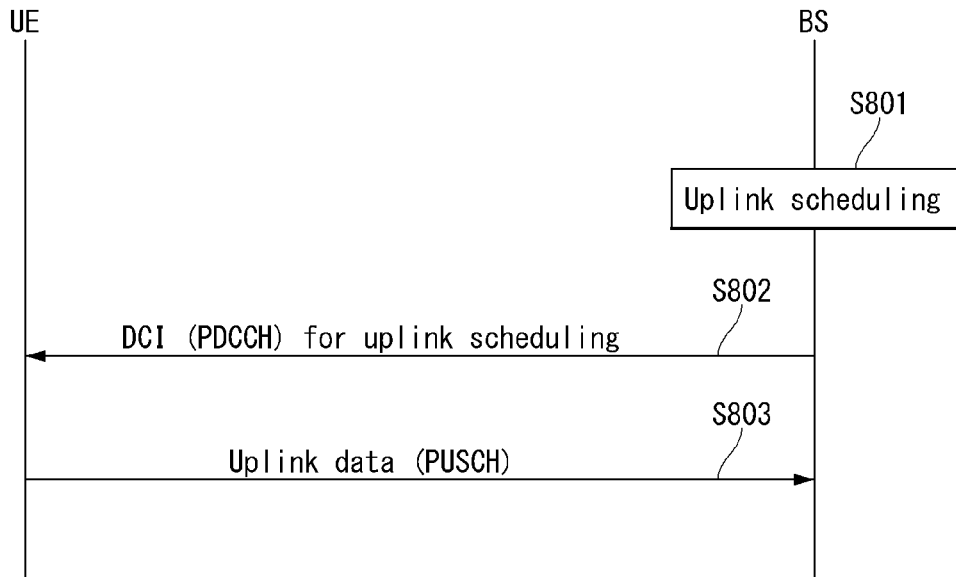
[FIG. 9]
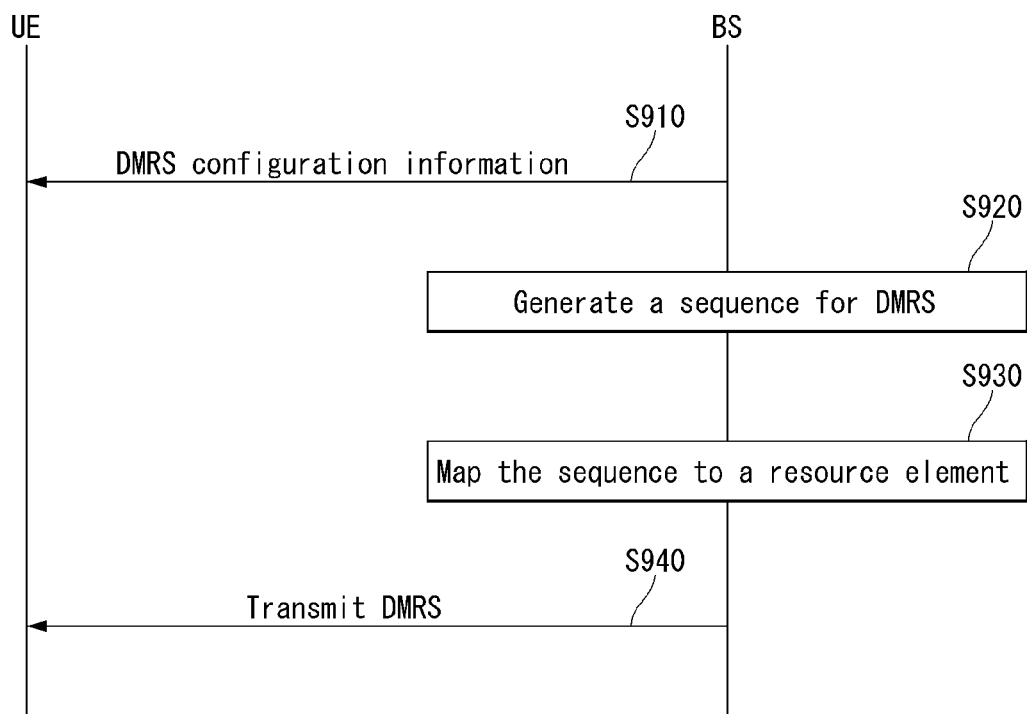

[FIG. 10]
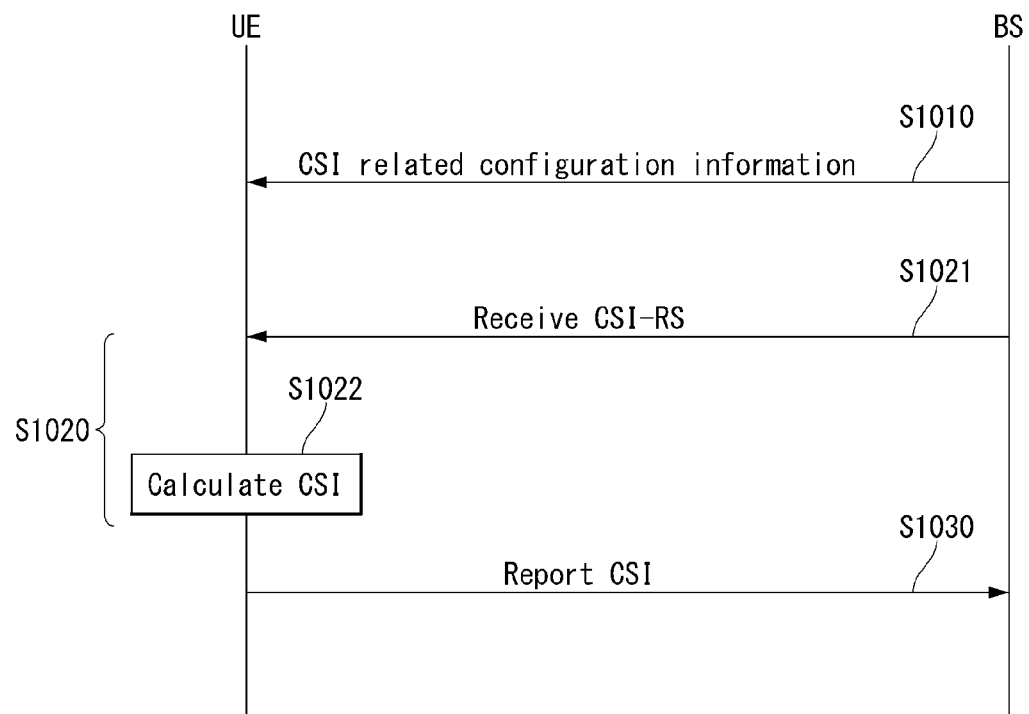

[FIG. 11]
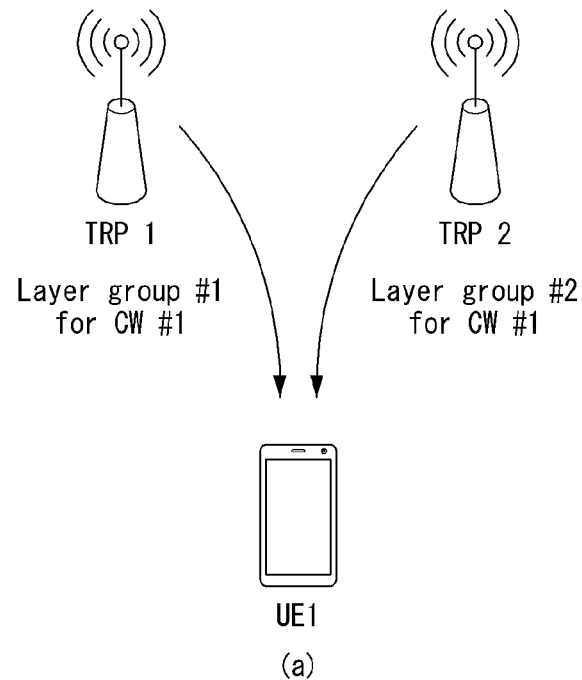
(a)
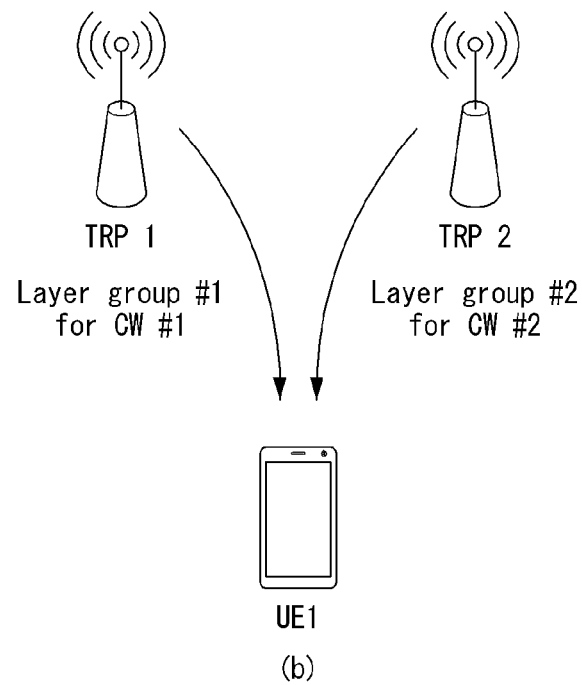
(b)

[FIG. 12]

| R | Serving Cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

. . .

| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N |

[FIG. 13]
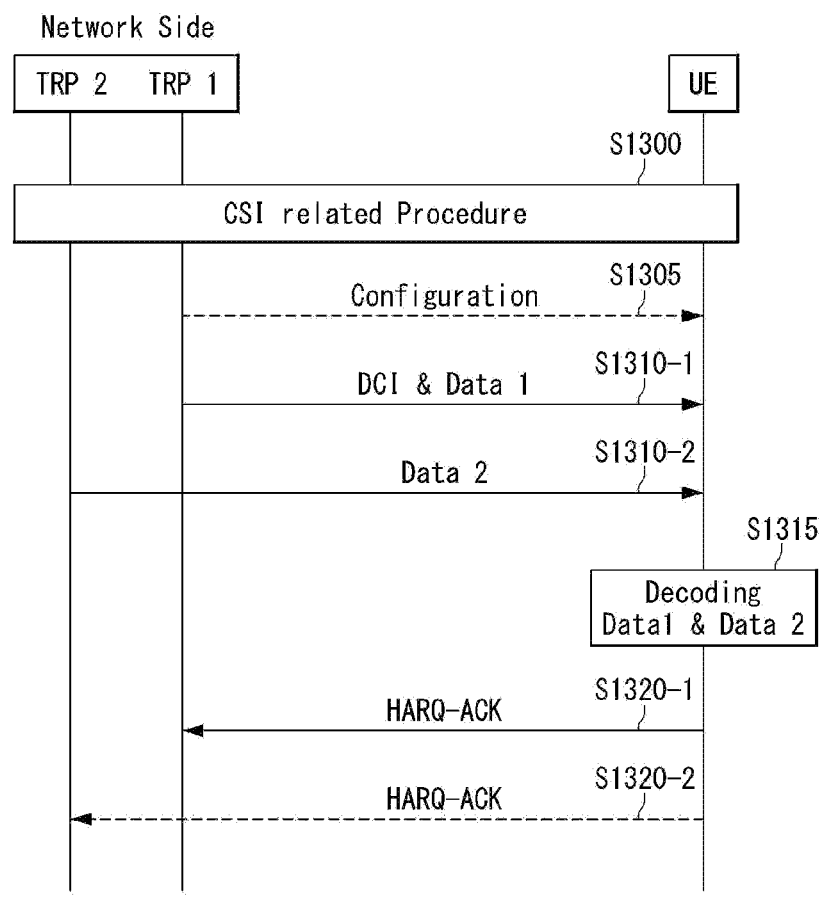
[FIG. 14]
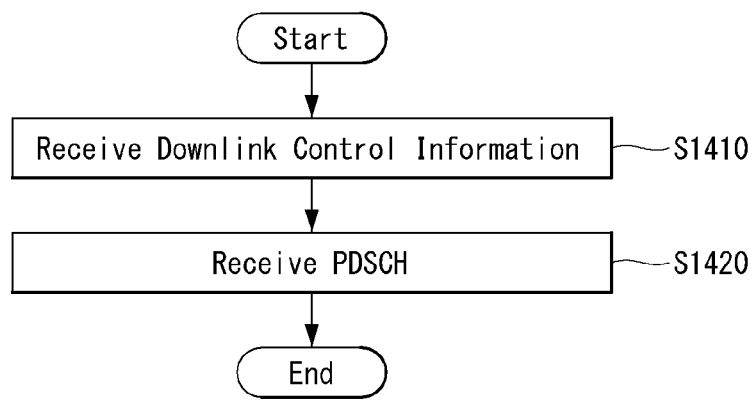

[FIG. 15]
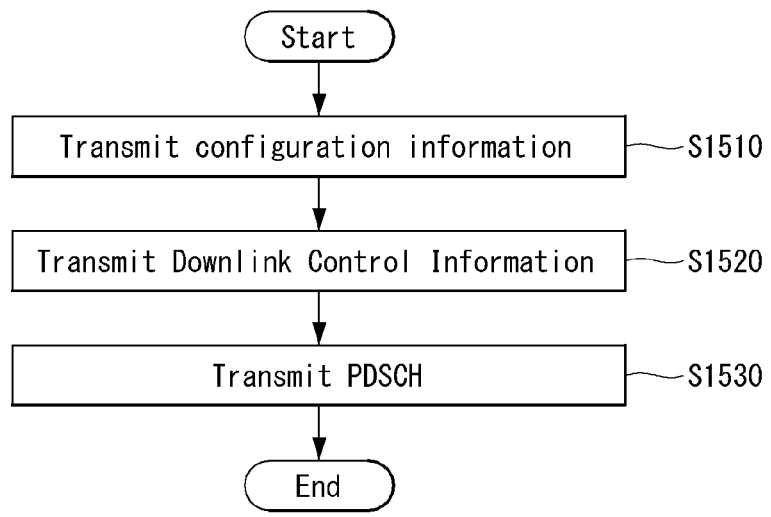
[FIG. 16]
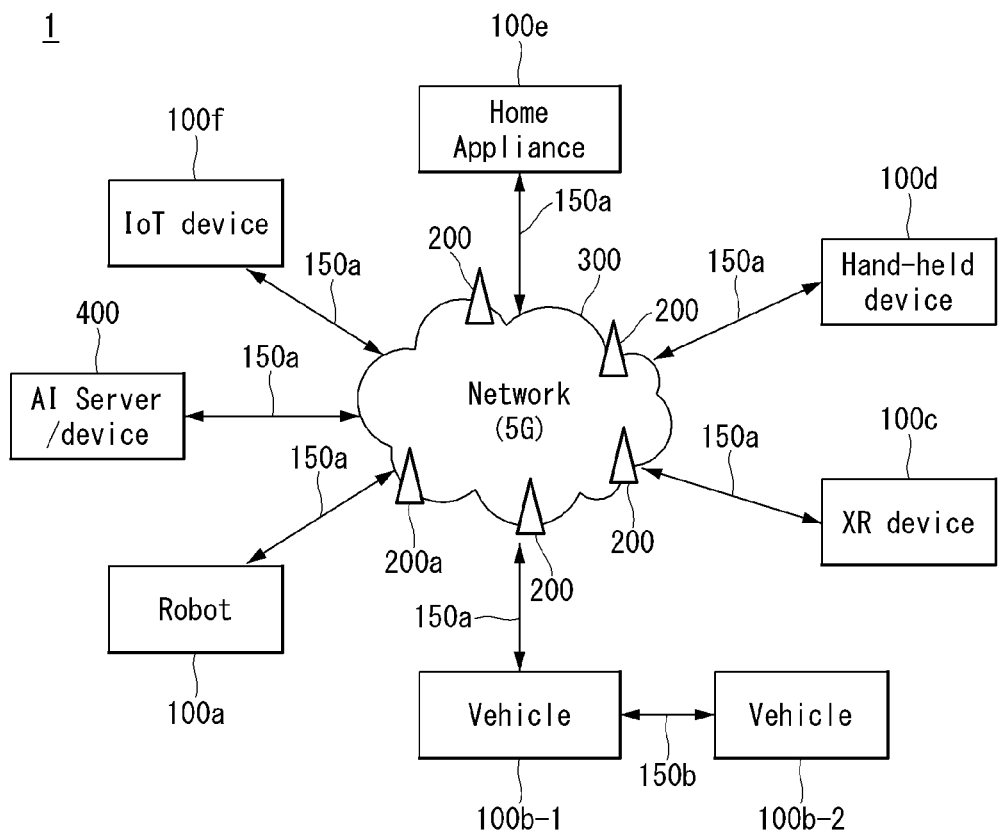

[FIG. 17]
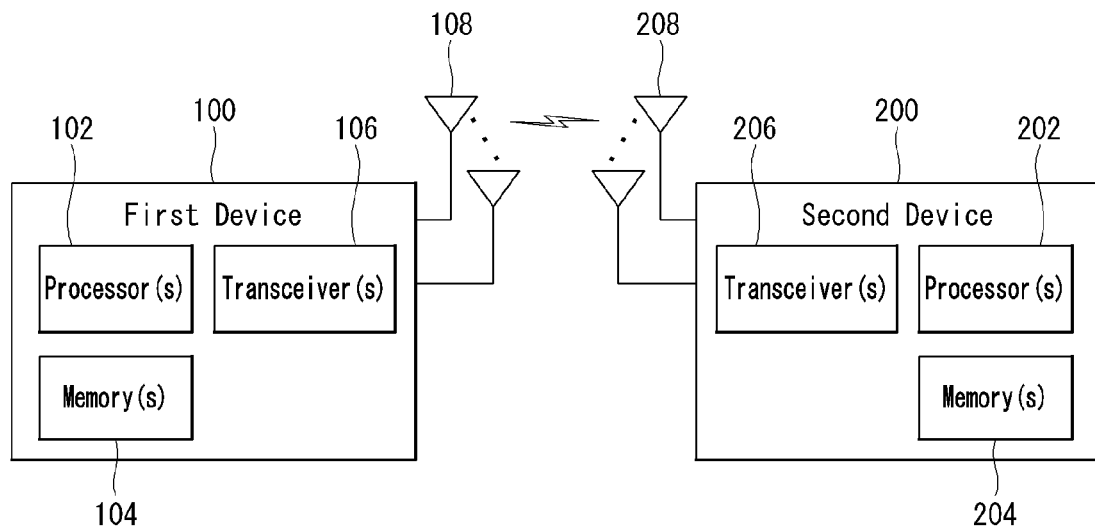
[FIG. 18]
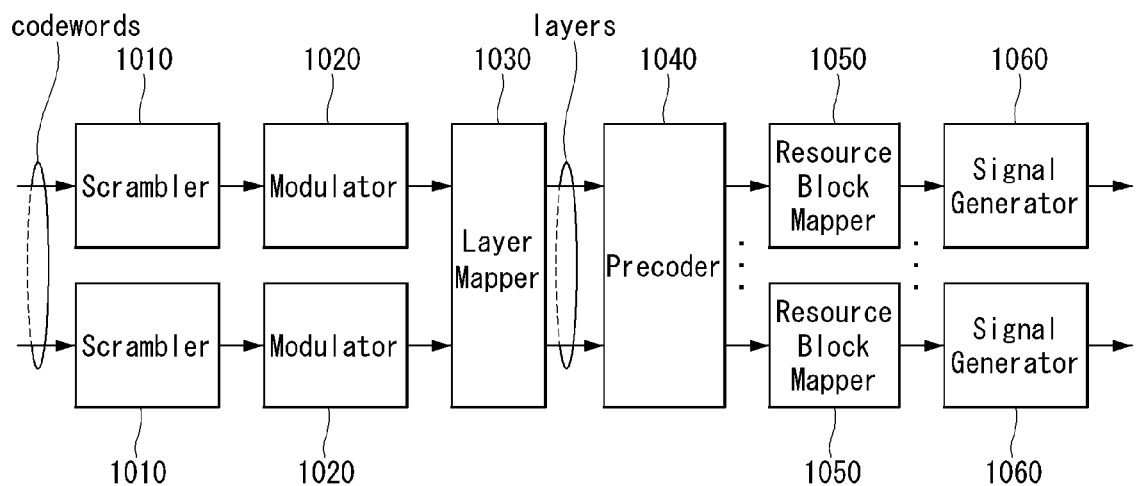

[FIG. 19]
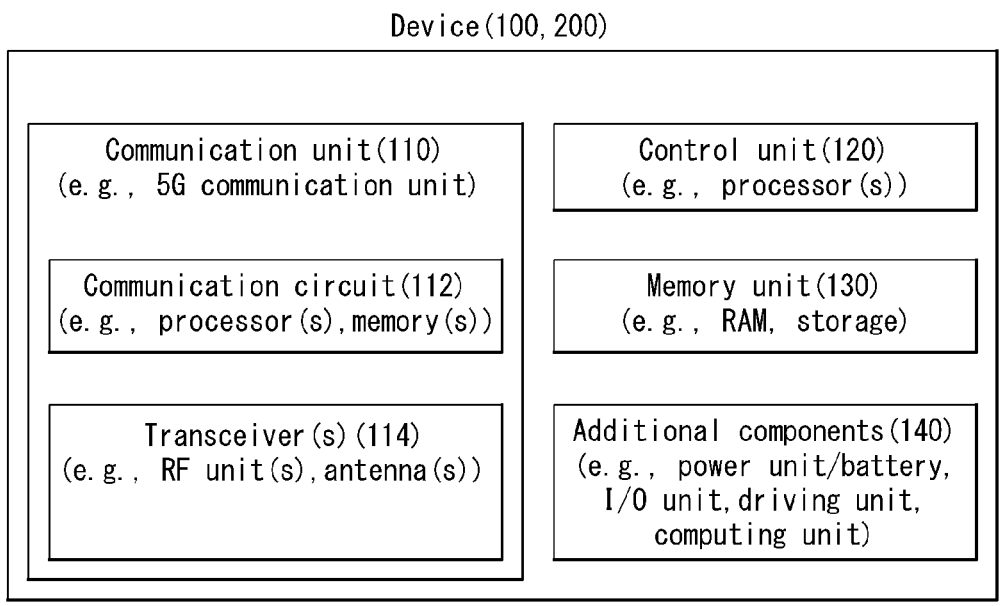

[FIG. 20]
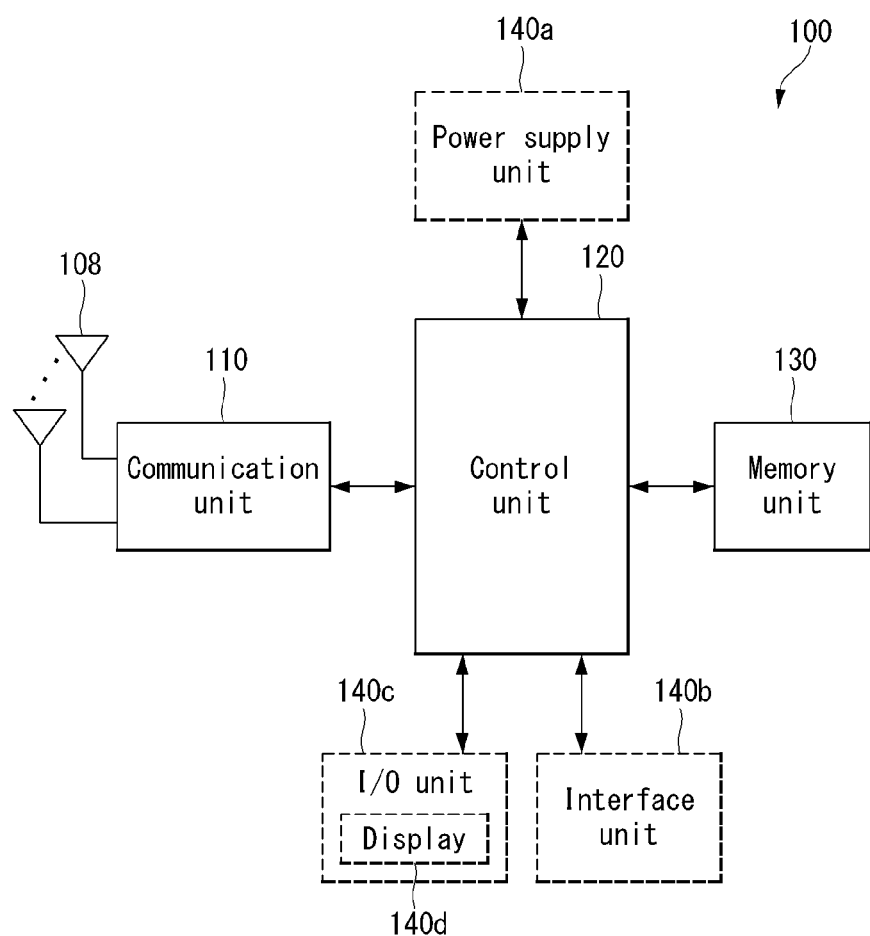

METHOD FOR TRANSMITTING OR RECEIVING PHYSICAL DOWNLINK SHARED CHANNEL IN WIRELESS COMMUNICATION SYSTEM AND DEVICE THEREFOR

CROSS-REFERENCE TO RELATED APPLICATION

This application is the National Stage filing under 35 U.S.C. 371 of International Application No. PCT/KR2020/005864, filed on May 4, 2020, which claims the benefit of KR Application No. 10-2019-0051873, filed on May 2, 2019, KR Application No. 10-2019-0055307, filed on May 10, 2019, and KR Application No. 10-2019-0123436, filed on Oct. 4, 2019, the contents of which are all hereby incorporated by reference herein in their entirety.

TECHNICAL FIELD

The present disclosure relates to a wireless communication system, and more particularly, a method for transmitting and receiving a Physical Downlink Shared Channel (PDSCH) for improving reliability based on multiple Transmission Reception Points (TRPs) and a device therefor.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure proposes a method for transmitting and receiving a Physical Downlink Shared Channel (PDSCH) performed by a User Equipment (UE) supported by multiple Transmission Reception Points (TRPs) in a wireless communication system.

Particularly, the present disclosure proposes a method for multiple TRPs to configure a transmission and reception operation of PDSCH for improving reliability.

Furthermore, the present disclosure proposes a method for defining a DMRS table which may be referenced in transmission and reception operation of PDSCH for improving reliability.

Furthermore, considering a situation in which multiple users (e.g., UEs) operate together, the present disclosure proposes a method for multiple users to use a DMRS port for a single user.

Furthermore, the present disclosure proposes a method for mapping a TCL state to a CDM group or a DMRS port.

Furthermore, the present disclosure proposes a method for determining a port number of PTRS.

Technical problems to be solved by the present disclosure are not limited by the above-mentioned technical problems, and other technical problems which are not mentioned above can be clearly understood from the following description by those skilled in the art to which the present disclosure pertains.

Technical Solution

A method for receiving a physical downlink shared channel (PDSCH) by a user equipment (UE) in a wireless communication system, the method according to an embodiment of the present disclosure comprising: receiving downlink control information (DCI); wherein the DCI includes i) a transmission configuration indication (TCI) field and ii) an antenna port field; and receiving the PDSCH scheduled based on the DCI, wherein a plurality of TCI states are indicated based on the TCI field, and demodulation reference signal (DM-RS) ports of a plurality of code division multiplexing (CDM) groups are indicated based on the antenna port field, and wherein a first TCI state among the plurality of TCI states corresponds to a CDM group including a first DM-RS port based on an instruction order of the DM-RS ports.

Furthermore, in the method according to an embodiment of the present disclosure, wherein based on the instruction order of the DMRS ports, an order of the plurality of CDM groups is determined.

Furthermore, in the method according to an embodiment of the present disclosure, wherein a TCI state other than the first TCI state corresponds to another CDM group other than a CDM group including the first DM-RS port.

Furthermore, in the method according to an embodiment of the present disclosure, wherein the PDSCH includes two codewords, wherein a number of DM-RS ports of the CDM group including the first DM-RS port and a number of DM-RS ports of the another CDM group are set to a specific number determined based on a total number of layers.

Furthermore, in the method according to an embodiment of the present disclosure, wherein a number of layers associated with each CDM group is set differently.

Furthermore, in the method according to an embodiment of the present disclosure, wherein layers are mapped based on indexes of the DM-RS ports regardless of the instruction order of the DM-RS ports.

Furthermore, in the method according to an embodiment of the present disclosure, wherein based the DCI being associated with a Modulation and Coding Scheme (MCS)-C-RNTI, the DM-RS ports correspond to a same TCI state.

Furthermore, in the method according to an embodiment of the present disclosure, further comprising: receiving information indicating that the DM-RS ports can be used by other terminals.

Furthermore, in the method according to an embodiment of the present disclosure, wherein the PDSCH is transmitted after a specific offset from a transmission time of the DCI, and wherein DM-RS ports included in the CDM group including the first DM-RS port are in QCL (Quasi co location) relationship with a reference signal related to the first TCI state.

Furthermore, a user equipment (UE) receiving a physical downlink shared channel (PDSCH) in a wireless communication system, the UE according to an embodiment of the present disclosure comprising: one or more transceivers; one or more processors; and one or more memories for storing instructions for operations executed by the one or more processors and being coupled to the one or more processors; wherein the operations comprises: receiving downlink control information (DCI); wherein the DCI includes i) a transmission configuration indication (TCI) field and ii) an antenna port field; and receiving the PDSCH scheduled based on the DCI, wherein a plurality of TCI states are indicated based on the TCI field, and demodulation reference signal (DM-RS) ports of a plurality of code division multiplexing (CDM) groups are indicated based on the antenna port field, and wherein a first TCI state among the plurality of TCI states corresponds to a CDM group including a first DM-RS port based on an instruction order of the DM-RS ports.

Furthermore, a method for transmitting a physical downlink shared channel (PDSCH) by a base station in a wireless communication system, the method according to an embodiment of the present disclosure comprising: transmitting downlink control information (DCI); wherein the DCI includes i) a transmission configuration indication (TCI) field and ii) an antenna port field; and transmitting the PDSCH scheduled based on the DCI, wherein a plurality of TCI states are indicated based on the TCI field, and demodulation reference signal (DM-RS) ports of a plurality of code division multiplexing (CDM) groups are indicated based on the antenna port field, and wherein a first TCI state among the plurality of TCI states corresponds to a CDM group including a first DM-RS port based on an instruction order of the DM-RS ports.

Furthermore, a base station for transmitting a physical downlink shared channel (PDSCH) in a wireless communication system, the base station according to an embodiment of the present disclosure comprising: one or more transceivers; one or more processors; and one or more memories for storing instructions for operations executed by the one or more processors and being coupled to the one or more processors; wherein the operations comprises: transmitting downlink control information (DCI); wherein the DCI includes i) a transmission configuration indication (TCI) field and ii) an antenna port field; and transmitting the PDSCH scheduled based on the DCI, wherein a plurality of TCI states are indicated based on the TCI field, and demodulation reference signal (DM-RS) ports of a plurality of code division multiplexing (CDM) groups are indicated based on the antenna port field, and wherein a first TCI state among the plurality of TCI states corresponds to a CDM group including a first DM-RS port based on an instruction order of the DM-RS ports.

Furthermore, an apparatus comprising one or more memories and one or more processors operatively coupled to the one or more memories, the apparatus according to an embodiment of the present disclosure comprising: wherein the one or more processors controls the apparatus to: receive downlink control information (DCI); wherein the DCI includes i) a transmission configuration indication (TCI) field and ii) an antenna port field; and receive the PDSCH scheduled based on the DCI, wherein a plurality of TCI states are indicated based on the TCI field, and demodulation reference signal (DM-RS) ports of a plurality of code division multiplexing (CDM) groups are indicated based on the antenna port field, and wherein a first TCI state among the plurality of TCI states corresponds to a CDM group including a first DM-RS port based on an instruction order of the DM-RS ports.

Furthermore, one or more non-transitory computer-readable media storing one or more instructions, the one or more instructions executable by one or more processors according to an embodiment of the present disclosure comprising: an instruction indicates a user equipment (UE) to: receive downlink control information (DCI); wherein the DCI includes i) a transmission configuration indication (TCI) field and ii) an antenna port field; and receive the PDSCH scheduled based on the DCI, wherein a plurality of TCI states are indicated based on the TCI field, and demodulation reference signal (DM-RS) ports of a plurality of code division multiplexing (CDM) groups are indicated based on the antenna port field, and wherein a first TCI state among the plurality of TCI states corresponds to a CDM group including a first DM-RS port based on an instruction order of the DM-RS ports.

Advantageous Effects

According to an embodiment of the present disclosure, PDSCH may be transmitted and received based on multiple Transmission Reception Points (TRPs).

Furthermore, according to an embodiment of the present disclosure, either one of operation that multiple TRPs performs an eMBB transmission or a URLLC transmission for improving reliability may be set to a User Equipment (UE).

Furthermore, according to an embodiment of the present disclosure, a DMRS table which may be referenced in a URLLC transmission may be defined, and a bit width for indicating a DMRS table may be decreased, and accordingly, signaling overhead may be improved.

Furthermore, according to an embodiment of the present disclosure, a DMRS port for a single user may be configured to be usable by multiple users, and resources may be efficiently used.

Furthermore, according to an embodiment of the present disclosure, an ambiguity for a mapping relation between a TCL state and a CDM group or DMRS port may be removed.

Furthermore, according to an embodiment of the present disclosure, a port number of PTRS is optimally determined according to a configuration of a base station or TRP.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates physical channels and general signal transmission used in a 3GPP system.

FIG. 7 is a diagram illustration an example of downlink transmission/reception operation.

FIG. 8 illustrates an example of uplink transmission/reception operation.

FIG. 9 is a flowchart illustrating an example of DL DMRS procedure.

FIG. 10 is a flowchart illustrating an example of a CSI related procedure.

FIG. 11 illustrates a transmission and reception method for reliability improvement supported by multiple TRPs, and the following two methods may be considered.

FIG. 12 illustrates an example of a message (e.g., MAC CE) for activation/deactivation of TCI states for UE-specific PDSCH MAC CE defined in TS38.321.

FIG. 13 illustrates an example of the signaling procedure of performing data transmission/reception between a Network side and a UE in a situation of multiple TRPs to which the method and/or embodiments proposed in the present disclosure may be applied.

FIG. 14 illustrates an example of PTRS reception operation flowchart of a User Equipment (UE) to which the method (e.g., Proposal 1/2/3/4/5, etc.) proposed in the present disclosure may be applied.

FIG. 15 illustrates an example of data transmission/reception operation flowchart of a Base Station (BS) to which the methods (e.g., Proposal 1/2/3/4/5, etc.) proposed in the present disclosure may be applied.

FIG. 16 illustrates a communication system applied to the present disclosure.

FIG. 17 illustrates a wireless device which may be applied to the present disclosure.

FIG. 18 illustrates a signal processing circuit for a transmit signal.

FIG. 19 illustrates another example of a wireless device applied to the present disclosure.

FIG. 20 illustrates a hand-held device applied to the present disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the present disclosure may be referred to for a background art, terms, abbreviations, etc., used for describing the present disclosure. For example, the following documents may be referred to.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description 36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New RAT (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is 60 kHz or higher there than, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots, \mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe, \mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
| --- | --- | --- | --- |
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l) where k=0, ..., $N_{RB}^\mu N_{sc}^{RB}-1$ is an index on a frequency domain, and l=0, ..., $2^\mu N_{symb}^{(\mu)}-1$ refers to a location of a symbol in a subframe. The index pair (k,l) is used to refer to a resource element in a slot, where l=0, ..., $N_{symb}^\mu-1$.

The resource element (k,l) for the numerology μ and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$ where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/ downlink signal transmission procedure. In particular, the UE may receive Downlink Control Information (DCI) through the PDCCH. Here, the DCI may include control information such as resource allocation information for the UE and formats may be differently applied according to a use purpose.

For example, in an NR system, DCI format 0_0 and DCI format 0_1 may be used for scheduling PUSCH in one cell, and DCI format 1_0 and DCI format 1_1 may be used for scheduling PDSCH in one cell. Information included in DCI format 0_0 is CRC-scrambled and transmitted by C-RNTI, CS-RNTI, or MCS-C-RNTI. In addition, DCI format 0_1 is used for reserving the PUSCH in one cell. Information included in DCI format 0_1 is CRC-scrambled and transmitted by C-RNTI, CS-RNTI, SP-CSI-RNTI, or MCS-C-RNTI. DCI format 1_0 is used for scheduling of the PDSCH in one DL cell. Information included in DCI format 1_0 is CRC-scrambled and transmitted by C-RNTI, CS-RNTI, or MCS-C-RNTI. DCI format 1_1 is used for scheduling of the PDSCH in one cell. Information included in DCI format 1_1 is CRC-scrambled and transmitted by C-RNTI, CS-RNTI, or MCS-C-RNTI. DCI format 2_1 is used to inform PRB(s) and OFDM symbol(s) of which the UE may assume not intending transmission. Information included in DCI format 2_1 such as preemption indication 1, preemption indication 2, . . . , preemption indication N, and the like is CRC-scrambled and transmitted by INT-RNTI.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/ RI, etc., through the PUSCH and/or PUCCH.

DL and UL Transmission/Reception Operation

Downlink Transmission/Reception Operation

FIG. 7 is a diagram illustration an example of downlink transmission/reception operation.

Referring to FIG. 7, a BS schedules downlink transmission such as a frequency/time resource, a transport layer, a downlink precoder, MCS, and the like (step S701). In particular, the BS may determine a beam for PDSCH transmission to a UE through the above-described beam management operations. The UE receives Downlink Control Information (DCI) for downlink scheduling (i.e., including scheduling information of the PDSCH) on the PDCCH from the BS (step S702). DCI format 1_0 or 1_1 may be used for the downlink scheduling and in particular, DCI format 1_1 includes the following information: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization.

Particularly, according to each state indicated in an antenna port(s) field, the number of DMRS ports may be scheduled and in addition, Single-user (SU)/Multi-user (MU) transmission scheduling is also available. Furthermore, a TCI field is configured by 3 bits and a maximum of 8 TCI states are indicated according to a TCI field value to dynamically the QCL for the DMRS. The UE receives downlink data from the BS on the PDSCH (step S703). When the UE detects a PDCCH including DCI format 1_0 or 1_1, the UE decodes the PDSCH according to the indication by the corresponding DCI.

Here, when the UE receives a PDSCH scheduled by DCI format 1_1, a DMRS configuration type may be configured by higher layer parameter 'dmrs-Type' in the UE, and the DMRS type is used for receiving the PDSCH. Furthermore, in the UE, the maximum number of front-loaded DMRA symbols for the PDSCH may be configured by higher layer parameter 'maxLength'.

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE. Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not associated with PDSCH transmission to another UE.

When the UE receives the PDSCH, a precoding granularity P' may be assumed as a consecutive resource block in the frequency domain. Here, P' may correspond to one value of {2, 4, and wideband}. When P' is determined as wideband, the UE does not predict that the PDSCH is scheduled to non-contiguous PRBs, and the UE may assume that the same precoding is applied to the allocated resource. On the contrary, when P' is determined as any one of {2 and 4}, a Precoding Resource Block Group (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE first reads a 5-bit MCD field in the DCI and determines the modulation order and the target code rate. In addition, the UE reads a redundancy version field in the DCI and determines a redundancy version. Furthermore, the UE determines the transport block size by using the number of layers before rate matching and the total number of allocated PRBs.

A transport block may be constructed with one or more code block groups (CBGs), and one CBG may be constructed with one or more code blocks (CBs). Furthermore, in an NR system, data transmission/reception in a CB/CBG unit as well as data transmission/reception in a transport block unit but also may be available. Accordingly, the UE may receive information on CB/CBG from the BS through DCI (e.g., DCI format 0_1, DCI format 1_1, etc.). In addition, the UE may receive information on a data transmission unit (e.g., TB/CB/CBG) from the BS.

Uplink Transmission/Reception Operation

FIG. 8 illustrates an example of uplink transmission/reception operation.

Referring to FIG. 8, a BS schedules uplink transmission such as the frequency/time resource, the transport layer, an uplink precoder, the MCS, and the like (step S801). In particular, the BS may determine a beam for PUSCH transmission of the UE through the above-described operations. A UE receives DCI for downlink scheduling (i.e., including scheduling information of the PUSCH) on the PDCCH (step S802). DCI format 0_0 or 0_1 may be used for the uplink scheduling and in particular, DCI format 0_1 includes the following information: Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

Particularly, SRS resources configured in an SRS resource set associated with higher layer parameter 'usage' may be indicated by an SRS resource indicator field. Further, 'spatialRelationInfo' may be configured for each SRS resource and a value of 'spatialRelationInfo' may be one of {CRI, SSB, and SRI}.

Furthermore, the UE transmits the uplink data to the BS on the PUSCH (step S803). When the UE detects a PDCCH including DCI format 0_0 or 0_1, the UE transmits the corresponding PUSCH according to the indication by the corresponding DCI. Two transmission schemes including a codebook based transmission and a non-codebook based transmission are supported for PUSCH transmission.

In the case of the codebook based transmission, when higher layer parameter txConfig' is set to 'codebook', the UE is configured to the codebook based transmission. On the contrary, when higher layer parameter txConfig' is set to 'nonCodebook', the UE is configured to the non-codebook based transmission. When higher layer parameter 'txConfig' is not configured, the UE does not predict that the PUSCH is scheduled by DCI format 0_1. When the PUSCH is scheduled by DCI format 0_0, the PUSCH transmission is based on a single antenna port. In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter 'nrofSRS-Ports'. When the UE is set to higher layer parameter 'txConfig' set to 'codebook', at least one SRS resource is configured in the UE. An SRI indicated in slot n is associated with most recent transmission of the SRS resource identified by the SRI and here, the SRS resource precedes PDCCH (i.e., slot n) carrying the SRI.

In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter 'srs-ResourceIndicator'. The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter 'usage' set to 'non-Codebook'. The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

DMRS (Demodulation Reference Signal)

A DMRS related operation for PDSCH reception is described.

When a UE receives a PDSCH scheduled by DCI format 1_0 or receives a PDSCH before configuring an arbitrary dedicated higher layer among dmrs-AdditionalPosition, maxLength and dmrs-Type parameters, the UE assumes that a PDSCH is not existed in an arbitrary symbol that carries a DM-RS excluding a PDSCH having an allocation duration of two symbols having PDSCH mapping type B, a single symbol front-loaded DM-RS of configuration type 1 is transmitted on DM-RS port 1000, and all of remaining orthogonal antenna ports are not related to transmission of PDSCH to another UE.

Additionally, for a PDSCH having mapping type A, the UE assumes that dmrs-AdditionalPosition='pos2' and a maximum of two additional single-symbol DM-RSs are existed in a slot depending on a PDSCH duration. With respect to a PDSCH having an allocation duration of 7 symbols for a normal CP or 6 symbols for an extended CP having mapping type B, when front-loaded DM-RS symbols are located at the $1^{st}$ and $2^{nd}$ symbols of PDSCH allocation duration, respectively, the UE assumes that an additional single symbol DM-RS is existed in the $5^{th}$ or $6^{th}$ symbol. Otherwise, the UE assumes that an additional DM-RS symbol is not existed. In addition, with respect to a PDSCH having an allocation duration of 4 symbols having mapping type B, the UE assumes that no more additional DM-RS symbol is not existed, with respect to a PDSCH having an allocation duration of 2 symbols having mapping type B, the UE assumes that an additional DM-RS symbol is not existed, and the UE assumes that a PDSCH is existed in a symbol that carries a DM-RS.

FIG. 9 is a flowchart illustrating an example of DL DMRS procedure.

A BS transmits DMRS configuration information to a UE (step S910).

The DMRS configuration information may refer to a DMRS-DownlinkConfig information element (IE). The DMRS-DownlinkConfig IE may include a dmrs-Type parameter, a dmrs-AdditionalPosition parameter, a maxLength parameter, and a phaseTrackingRS parameter.

The 'dmrs-Type' parameter is a parameter for selecting a DMRS configuration type to be used for DL. In NR, the DMRS may be divided into two configuration types: (1) DMRS configuration type 1 and (2) DMRS configuration type 2. DMRS configuration type 1 has a higher RS density in the frequency domain, and DMRS configuration type 2 has more DMRS antenna ports.

The 'dmrs-AdditionalPosition' parameter is a parameter indicating the position of an additional DMRS on DL. In the case that the corresponding parameter is not existed, the UE applies pos2 value. For the DMRS, a first position of front-loaded DMRS is determined according to PDSCH mapping type (type A or type B), and an additional DMRS may be set to support the UE of high speed. The front-loaded DMRS is indicated by RRC signaling and DCI (downlink control information).

The 'maxLength' parameter is a parameter indicating the maximum number of OFDM symbols for a DL front-loaded DMRS. The phaseTrackingRS parameter is a parameter for configuring a DL PTRS. In the case that the parameter is not existed or terminated, the UE assumes that there is no DL PTRS.

The BS generates a sequence used for DMRS (step S920).

The sequence for DMRS is generated according to Equation 3 below.

$$r(n) = \frac{1}{\sqrt{2}}(1 - 2 \cdot c(2n)) + j\frac{1}{\sqrt{2}}(1 - 2 \cdot c(2n+1))$$ [Equation 3]

The pseudo-random sequence c(i) is defined in 3gpp TS 38.211 5.2.1. That is, c(i) may be a gold sequence of length-31 using two m-sequences. A pseudo-random sequence generator is initialized by Equation 4 below.

$$c_{init}(2^{17}(N_{symb}^{slot}n_{s,f}^{\mu}+l+1)(2N_{ID}^{nSCID}+1)+2N_{ID}^{nSCID}+n_{SCID})\bmod 2^{31}$$ [Equation 4]

Here, l is the number of OFDM symbol in a slot, and $n_{s,f}^{\mu}$ is a slot number in a frame.

Furthermore, if $N_{ID}^{0}, N_{ID}^{1} \in \{0, 1, \ldots, 65535\}$ is provided, and in the case that a PDSCH is scheduled by a PDCCH using DCI format 1_1 with CRC scrambled by C-RNTI, MCS-C-RNTI, or CS-RNTI, $N_{ID}^{0}, N_{ID}^{1} \in \{0, 1, \ldots, 65535\}$ is given by higher-layer parameter scramblingID0 and scramblingID1 in DMRS-DownlinkConfig IE, respectively.

If $N_{ID}^{0} \in \{0, 1, \ldots, 65535\}$ is provided, and in the case that a PDSCH is scheduled by a PDCCH using DCI format 1_0 with CRC scrambled by C-RNTI, MCS-C-RNTI, or CS-RNTI, $N_{ID}^{0} \in \{0, 1, \ldots, 65535\}$ is given by higher-layer parameter scramblingID0 in DMRS-DownlinkConfig IE.

$N_{ID}^{nSCID} = N_{ID}^{cell}$, otherwise, and in the case that DCI format 1_1 is used, quantity $n_{SCID} \in \{0, 1\}$ is given by a DMRS sequence initialization field in DCI which is associated with PDSCH transmission.

The BS maps the generated sequence to a resource element (step S930). Here, the resource element may include at least one of a time, a frequency, an antenna port, or code.

The BS transmits the DMRS to the UE on the resource element (step S940). The UE receives a PDSCH using the received DMRS.

UE DM-RS Transmission Procedure

A DMRS related operation for PUSCH reception is described. As described above, UL means a signal transmission (or communication) from a UE to a BS. UL DMRS related operation may be similar to the DL DMRS related operation described above, and the terms of the parameters related to DL may be substituted by parameters related to UL.

That is, DMRS-DownlinkConfig IE may be substituted by DMRS-UplinkConfig IE, PDSCH mapping type may be substituted by PUSCH mapping type, and PDSCH may be substituted by PUSCH. Furthermore, in the DL DMRS related operation, the BS may be substituted by the UE, and the UE may be substituted by the BS. A sequence generation for UL DMRS may be differently defined depending on whether transform precoding is enabled.

Hereinafter, UE DM-RS transmission procedure is described in more detail.

In the case that a transmitted PUSCH is not scheduled by DCI format 0_1 with CRC scrambled by C-RNTI, CS-RNTI, or MCS-C-RNTI and does not correspond to a configured grant, the UE uses a single symbol front-loaded DM-RS of configuration type 1 in DM-RS port 0, and the remaining RE not used for DM-RS in the symbols is not used for any PUSCH transmission except the PUSCH having an allocation duration of an OFDM symbol of 2 or less having disabled transform precoding. Additional DM-RS may be transmitted according to a scheduling type and a PUSCH duration by considering whether frequency hopping is enabled.

In the case that the frequency hopping is disabled, the UE assumes that dmrs-AdditionalPosition may be the same as 'pos2', and a maximum of 2 additional DM-RSs may be transmitted according to the PUSCH duration. In the case that the frequency hopping is enabled, the UE assumes that dmrs-AdditionalPosition may be the same as 'pos1', and a maximum of one additional DM-RSs may be transmitted according to a PUSCH duration.

When a transmitted PUSCH is scheduled by activated DCI format 0_0 having scrambled CRC by CS-RNTI, the UE uses a single symbol front-loaded DM-RS of a configuration type provided by higher layer parameter dmrs-Type of configuredGrantConfig on DM-RS port 0, and the remaining RE not used for DM-RS in the symbols is not used for any PUSCH transmission except the PUSCH having an allocation duration of an OFDM symbol of 2 or less having disabled transform precoding. Further, additional DM-RS with dmrs-AdditionalPosition from configuredGrantConfig may be transmitted based on a scheduling type and a PUSCH duration by considering whether frequency hopping is enabled.

In the case that a transmitted PUSCH is scheduled by DCI format 0_1 with CRC scrambled by C-RNTI, CS-RNTI, or MCS-C-RNTI and corresponds to a configured grant, The UE may be configured to higher layer parameter dmrs-Type in DMRS-UplinkConfig, and the configured DM-RS configuration type may be used for PUSCH transmission.

The UE may be configured with a maximum number of front-loaded DM-RS symbols for PUSCH by higher layer parameter maxLength in DMRS-UplinkConfig.

In the case that the UE that transmits a PUSCH is configured to higher layer parameter phaseTrackingRS in DMRS-UplinkConfig, the UE may assume that the following configurations may not coincide by the transmitted PUSCH.

With respect to DM-RS configuration type 1 and type 2, an arbitrary DM-RS port among 4-7 or 6-11 is scheduled by each UE, and a PT-RS is transmitted by the UE.

With respect to a PUSCH scheduled by DCI format 0_1, by activated DCI format 0_1 with CRC scrambled by CS-RNTI or configured grant type 1, the UE assumes that DM-RS CDM group is not used for data transmission.

QCL (Quasi-Co Location)

The antenna port is defined so that a channel in which the symbol on the antenna port is transported may be inferred from a channel in which different symbols on the same antenna port are transported. When a property of a channel in which a symbol on one antenna port is transported may be inferred from a channel in which symbols on different antenna ports are transported, two antenna ports may have a quasi co-located or quasi co-location (QC/QCL) relationship.

Here, the channel property includes at least one of a delay spread, a Doppler spread, a frequency/Doppler shift, average received power, received timing/average delay, and a spatial Rx parameter. Here, the spatial Rx parameter means a spatial (receive) channel property parameter such as angle of arrival.

The US may be configured as a list of up to M TCI-State configurations in higher layer parameter PDSCH-Config in order to decode the PDSCH according to detected PDCCH having an intended DCI for the corresponding UE and a given serving cell. The M depends on a UE capability.

Each TCI-State includes a parameter for configuring a quasi co-location relationship between one or two DL reference signals and a DM-RS port of the PDSCH.

The quasi co-location relationship is configured as higher layer parameter qcl-Type1 for a first DL RS and qcl-Type2 (when configured) for a second DL RS. Two DL RSs are not the same as each other in terms of QCL type regardless of whether two DL RS are DL RSs having the same reference or DL RSs having different references.

A quasi co-location type corresponding to each DL RS may be given by higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is specific NZP CSI-RS, corresponding NZP CSI-RS antenna ports may be indicated/configured to be QCL with specific TRS from the viewpoint of QCL-Type A and specific SSB from the viewpoint of QCL-Type D. The UE that receives the indication/configuration may receive the corresponding NZP CSI-RS by using a Doppler delay value measured in QCL-TypeATRS and apply an Rx beam used for receiving QCL-TypeD SSB to reception of the corresponding NZP CSI-RS.

The UE may receive an activation command by MAC CE signaling which is used for mapping TCI states up to 8 to a codepoint DCI field 'Transmission Configuration Indication'.

With respect to a beam indication, the UE may be configured by RRC with a list for a maximum of M candidate Transmission Configuration Indication (TCI) states for the purpose of at least QCL (Quasi Co-location) indication. Here, M may be 64.

Each TCI state may be set to one RS set. Each ID of the DL RSs for a spatial QCL purpose (QCL type D) in at least RS set may be referred to one of DL RS types such as SSB, P-CSI RS, SP-CSI RS, A-CSI RS, and the like. The initialization/update of the ID of the DL RS(s) in the RS set used for at least a spatial QCL purpose may be performed through at least explicit signaling.

TCI-State IE is associated with quasi co-location (QCL) type that corresponds to one or two DL reference signal (RS). TCI-State IE may include a parameter such as bwp-Id/referencesignal/QCL type, and the like.

The bwp-Id parameter indicates a DL BWP on which the RS is located, the cell parameter indicates a carrier on which the RS is located, and the referencesignal parameter indicates a reference antenna port(s) that becomes a source of quasi co-location for the corresponding target antenna port(s) or a reference signal including the reference antenna port(s). The target antenna port(s) may be CSI-RS, PDCCH DMRS, or PDSCH DMRS. In one example, in order to indicate QCL reference RS information for NZP CSI-RS, the NZP CSI-RS resource configuration information may indicate the corresponding TCI state ID. In another example, in order to indicate QCL reference information for PDCCH DMRS antenna port(s), each CORESET configuration may indicate the TCI state ID. In still another example, in order to indicate QCL reference information for PDSCH DMRS antenna port(s), TCI state ID may be indicated through DCI.

CSI Related Operation

In a New Radio (NR) system, a channel state information-reference signal (CSI-RS) is used for time and/or frequency tracking, CSI computation, layer 1 (L1)-reference signal received power (RSRP) computation, and mobility. Here, the CSI computation is related to CSI acquisition, and L1-RSRP computation is related to beam management (BM).

Channel state information (CSI) collectively refers to information that may indicate the quality of a radio channel (or referred to as a link) formed between the UE and the antenna port.

FIG. 10 is a flowchart illustrating an example of a CSI related procedure.

Referring to FIG. 10, in order to perform one of usages of the CSI-RS, a terminal (e.g., user equipment (UE)) receives, from a base station (e.g., general Node B or gNB), configuration information related to the CSI through radio resource control (RRC) signaling (step S1010).

The configuration information related to the CSI may include at least one of CSI-interference management (IM) resource related information, CSI measurement configuration related information, CSI resource configuration related information, CSI-RS resource related information, or CSI report configuration related information.

The CSI-IM resource related information may include CSI-IM resource information, CSI-IM resource set information, and the like. The CSI-IM resource set is identified by a CSI-IM resource set identifier (ID), and one resource set includes at least one CSI-IM resource. Each CSI-IM resource is identified by a CSI-IM resource ID.

The CSI resource configuration related information may be expressed as CSI-ResourceConfig IE. The CSI resource configuration related information defines a group including at least one of a non-zero power (NZP) CSI-RS resource set, a CSI-IM resource set, or a CSI-SSB resource set. In other words, the CSI resource configuration related information may include a CSI-RS resource set list and the CSI-RS resource set list may include at least one of a NZP CSI-RS resource set list, a CSI-IM resource set list, or a CSI-SSB resource set list. The CSI-RS resource set is identified by a CSI-RS resource set ID, and one resource set includes at least one CSI-RS resource. Each CSI-RS resource is identified by a CSI-RS resource ID.

Table 5 represents an example of NZP CSI-RS resource set IE. As represented in Table 5, parameters (e.g., a BM related 'repetition' parameter and a tracking related 'trs-Info' parameter) representing the usage of CSI-RS may be configured for each NZP CSI-RS resource set.

TABLE 5

| |
|---|
| -- ASN1START |
| -- TAG-NZP-CSI-RS-RESOURCESET-START |
| NZP-CSI-RS-ResourceSet ::=     SEQUENCE { |
|    nzp-CSI-ResourceSetId            NZP-CSI-RS-ResourceSetId, |
|    nzp-CSI-RS-Resources             SEQUENCE (SIZE (1..maxNrofNZP-CSI-RS-ResourcesPerSet)) OF NZP-CSI-RS-ResourceId, |
|    repetition                       ENUMERATED { on, off } |
|    aperiodicTriggeringOffset        INTEGER(0..4) |
|    trs-Info                         ENUMERATED {true} |
|    ... |
| } |
| -- TAG-NZP-CSI-RS-RESOURCESET-STOP |
| -- ASN1STOP |

In addition, the repetition parameter corresponding to the higher layer parameter corresponds to 'CSI-RS-ResourceRep' of L1 parameter.

The CSI report configuration related information includes a reportConfigType parameter representing a time domain behavior and a reportQuantity parameter representing a CSI related quantity for reporting. The time domain behavior may be periodic, aperiodic, or semi-persistent.

The CSI report configuration related information may be expressed as CSI-ReportConfig IE, and Table 6 below represents an example of CSI-ReportConfig IE.

TABLE 6

| | | |
|---|---|---|
| -- ASN1START | | |
| -- TAG-CSI-RESOURCECONFIG-START | | |
| CSI-ReportConfig ::= | SEQUENCE { | |
|   reportConfigId | CSI-ReportConfigId, | |
|   carrier | ServCellIndex | OPTIONAL, - Need S |
|   resourcesForChannelMeasurement | CSI-ResourceConfigId, | |
|   csi-IM-ResourcesForInterference | CSI-ResourceConfigId | OPTIONAL, - Need R |
|   nzp-CSI-RS-ResourcesForInterference | CSI-ResourceConfigId | OPTIONAL, - Need R |
|   reportConfigType | CHOICE { | |
|     periodic | SEQUENCE { | |
|       reportSlotConfig | CSI-ReportPeriodicityAndOffset, | |
|       pucch-CSI-ResourceList | SEQUENCE (SIZE (1..maxNrofBWPs)) OF PUCCH-CSI-Resource | |
|     }, | | |
|     semiPersistentOnPUCCH | SEQUENCE { | |
|       reportSlotConfig | CSI-ReportPeriodicityAndOffset, | |

TABLE 6-continued

| | |
|---|---|
| pucch-CSI-ResourceList | SEQUENCE (SIZE |
| (1..maxNrofBWPs)) OF PUCCH-CSI-Resource | |
| }, | |
| semiPersistentOnPUSCH | SEQUENCE { |
| reportSlotConfig | ENUMERATED {sl5, sl10, sl20, |
| sl40, sl80, sl160, sl320}, | |
| reportSlotOffsetList | SEQUENCE (SIZE (1.. maxNrofUL- |
| Allocations)) OF INTEGER(0..32), | |
| p0alpha | P0-PUSCH-AlphaSetId |
| }, | |
| aperiodic | SEQUENCE { |
| reportSlotOffsetList | SEQUENCE (SIZE (1..maxNrofUL- |
| Allocations)) OF INTEGER(0..32) | |
| } | |
| }, | |
| reportQuantity | CHOICE { |
| none | NULL, |
| cri-RI-PMI-CQI | NULL, |
| cri-RI-i1 | NULL, |
| cri-RI-i1-CQI | SEQUENCE { |
| pdsch-BundleSizeForCSI | ENUMERATED {n2, n4} |
| OPTIONAL | |
| }, | |
| cri-RI-CQI | NULL, |
| cri-RSRP | NULL, |
| ssb-Index-RSRP | NULL, |
| cri-RI-LI-PMI-CQI | NULL |
| }, | |

The UE measures CSI based on configuration information related to the CSI (step S1020). The CSI measurement may include (1) a CSI-RS reception process of the UE (step S1021) and (2) a process of computing the CSI through the received CSI-RS (step S1022), and a detailed description thereof will be described below.

For the CSI-RS, resource element (RE) mapping of a CSI-RS resource is configured time and frequency domains by higher layer parameter CSI-RS-ResourceMapping.

Table 7 represents an example of CSI-RS-ResourceMapping IE.

Here, in the case that a quantity of CSI-ReportConfig of Table 7 is configured to 'none (or No report)', the UE may skip the report.

However, even in the case that the quantity is configured to 'none (or No report)', the UE may report the measured CSI to the BS.

The case where the quantity is configured to 'none (or No report)' is a case of triggering aperiodic TRS or a case where repetition is configured.

Here, only in the case where the repetition is configured to 'ON', the report of the UE may be skipped.

TABLE 7

| | |
|---|---|
| -- ASN1START | |
| -- TAG-CSI-RS-RESOURCEMAPPING-START | |
| CSI-RS-ResourceMapping ::= | SEQUENCE { |
| frequencyDomainAllocation | CHOICE { |
| row1 | BIT STRING (SIZE (4)), |
| row2 | BIT STRING (SIZE (12)), |
| row4 | BIT STRING (SIZE (3)), |
| other | BIT STRING (SIZE (6)) |
| }, | |
| nrofPorts | ENUMERATED {p1,p2,p4,p8,p12,p16,p24,p32}, |
| firstOFDMSymbolInTimeDomain | INTEGER (0..13), |
| firstOFDMSymbolInTimeDomain2 | INTEGER (2..12) |
| cdm-Type | ENUMERATED {noCDM, fd-CDM2, cdm4-FD2-TD2, cdm8-FD2-TD4}, |
| density | CHOICE { |
| dot5 | ENUMERATED {evenPRBs, oddPRBs}, |
| one | NULL, |
| three | NULL, |
| spare | NULL |
| }, | |
| freqBand | CSI-FrequencyOccupation, |
| ... | |
| } | |

In Table 7, a density (D) represents a density of the CSI-RS resource measured in RE/port/physical resource block (PRB), and nrofPorts represents the number of antenna ports.

The UE reports the measured CSI to the BS (step S1030).

CSI Measurement

The NR system supports more flexible and dynamic CSI measurement and reporting. Here, the CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported. A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching. In addition, in NZP CSI-RS based IMR, each port emulates an interference layer having (a preferable channel and) precoded NZP CSI-RS. This is for intra-cell interference measurement with respect to a multi-user case and primarily targets MU interference.

The BS transmits the precoded NZP CSI-RS to the UE on each port of the configured NZP CSI-RS based IMR.

The UE assumes a channel/interference layer for each port and measures interference.

In respect to the channel, when there is no PMI and RI feedback, multiple resources are configured in a set, and the BS or the network indicates a subset of NZP CSI-RS resources through the DCI with respect to channel/interference measurement.

Resource setting and resource setting configuration will be described in more detail.

Resource Setting

Each CSI resource setting 'CSI-ResourceConfig' includes a configuration for S≥1 CSI resource set (given by higher layer parameter csi-RS-ResourceSetList). The CSI resource setting corresponds to the CSI-RS-resourcesetlist. Here, S represents the number of configured CSI-RS resource sets. Here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id. In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent. The number S of configured CSI-RS resource sets is limited to '1' with respect to periodic and semi-persistent CSI resource settings. Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConfig.

When the UE is configured as multiple CSI-ResourceConfigs including the same CSI-IM resource ID, the same time domain behavior is configured with respect to CSI-ResourceConfig.

Next, one or more CSI resource settings for channel measurement (CM) and interference measurement (IM) are configured through higher layer signaling.

CSI-IM resource for interference measurement.
NZP CSI-RS resource for interference measurement.
NZP CSI-RS resource for channel measurement.

That is, channel measurement resource (CMR) may be NZP CSI-RS and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are 'QCL-TypeD' for each resource.

Resource Setting Configuration

As described, the resource setting may mean a resource set list.

In each trigger state configured by using higher layer parameter CSI-AperiodicTriggerState with respect to aperiodic CSI, each CSI-ReportConfig is associated with one or multiple CSI-ReportConfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is used for channel measurement for L1-RSRP computation.

When two resource settings are configured, a first resource setting (given by higher layer parameter resourcesForChannelMeasurement) is used for channel measurement and a second resource setting (given by csi-IM-ResourcesForInterference or nzp-CSI-RS-ResourcesForInterference) is used for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each CSI-ReportConfig is linked to periodic or semi-persistent resource setting with respect to semi-persistent or periodic CSI.

When one resource setting (given by resourcesForChannelMeasurement) is configured, the resource setting is used for channel measurement for L1-RSRP computation.

When two resource settings are configured, a first resource setting (given by resourcesForChannelMeasurement) is used for channel measurement and a second resource setting (given by higher layer parameter csi-IM-ResourcesForInterference) is used for interference measurement performed on CSI-IM.

CSI Computation

When interference measurement is performed on CSI-IM, each CSI-RS resource for channel measurement is associated with the CSI-IM resource for each resource by an order of CSI-RS resources and CSI-IM resources within a corresponding resource set. The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

A UE in which Higher layer parameter nzp-CSI-RS-ResourcesForInterference is configured does not expect that 18 or more NZP CSI-RS ports will be configured in the NZP CSI-RS resource set.

For CSI measurement, the UE assumes the followings.

Each NZP CSI-RS port configured for interference measurement corresponds to an interference transport layer.

In all interference transport layers of the NZP CSI-RS port for interference measurement, an energy per resource element (EPRE) ratio is considered.

Different interference signals on RE(s) of the NZP CSI-RS resource for channel measurement, the NZP CSI-RS resource for interference measurement, or CSI-IM resource for interference measurement.

CSI Reporting

For CSI reporting, time and frequency resources which may be used by the UE are controlled by the BS.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states. In the aperiodicTriggerStateList, each trigger state includes the channel and an associated CSI-ReportConfigs list optionally indicating resource set IDs for interference. In the semiPersistentOnPUSCH-TriggerStateList, each trigger state includes one associated CSI-ReportConfig.

In addition, the time domain behavior of CSI reporting supports periodic, semi-persistent, and aperiodic.

i) The periodic CSI reporting is performed on short PUCCH and long PUCCH. The periodicity and slot offset of the periodic CSI reporting may be configured as RRC and refer to the CSI-ReportConfig IE.

ii) Semi-periodic (SP) CSI reporting is performed on short PUCCH, long PUCCH, or PUSCH.

In the case of SP CSI on the short/long PUCCH, the periodicity and the slot offset are configured as the RRC and the CSI reporting to separate MAC CE/DCI is activated/deactivated.

In the case of the SP CSI on the PUSCH, the periodicity of the SP CSI reporting is configured through the RRC, but the slot offset is not configured through the RRC, and the SP CSI reporting is activated/deactivated by DCI (format 0_1). Separated RNTI (SP-CSI C-RNTI) is used with respect to the SP CSI reporting on the PUSCH.

An initial CSI reporting timing follows a PUSCH time domain allocation value indicated in the DCI and a subsequent CSI reporting timing follows a periodicity configured through the RRC.

DCI format 0_1 may include a CSI request field and may activate/deactivate a specific configured SP-CSI trigger state. The SP CSI reporting has the same or similar activation/deactivation as a mechanism having data transmission on SPS PUSCH.

iii) The aperiodic CSI reporting is performed on the PUSCH and is triggered by the DCI. In this case, information related to trigger of aperiodic CSI reporting may be transferred/indicated/configured through MAC-CE.

In the case of AP CSI having AP CSI-RS, an AP CSI-RS timing is configured by the RRC and a timing for AP CSI reporting is dynamically controlled by the DCI.

The NR does not adopt a scheme (for example, transmitting RI, WB PMI/CQI, and SB PMI/CQI in order) of dividing and reporting the CSI in multiple reporting instances applied to PUCCH based CSI reporting in the LTE. Instead, the NR restricts specific CSI reporting not to be configured in the short/long PUCCH and a CSI omission rule is defined. In addition, in relation with the AP CSI reporting timing, a PUSCH symbol/slot location is dynamically indicated by the DCI. In addition, candidate slot offsets are configured by the RRC. For the CSI reporting, slot offset(Y) is configured for each reporting setting. For UL-SCH, slot offset K2 is configured separately.

Two CSI latency classes (low latency class and high latency class) are defined in terms of CSI computation complexity. The low latency CSI is a WB CSI that includes up to 4 ports Type-I codebook or up to 4-ports non-PMI feedback CSI. The high latency CSI refers to CSI other than the low latency CSI. For a normal UE, (Z, Z') is defined in a unit of OFDM symbols. Here, Z represents a minimum CSI processing time from the reception of the aperiodic CSI triggering DCI to the execution of the CSI reporting. Further, Z' represents a minimum CSI processing time from the reception of the CSI-RS for channel/interference to the execution of the CSI reporting.

Additionally, the UE reports the number of CSIs which may be simultaneously calculated.

The descriptions (e.g., 3GPP system, frame structure, DL and UL transmission/reception operation, etc.) described above may be applied/used in combination with the method and/or embodiments proposed in the present disclosure or supplemented to clarify the technical feature of the methods proposed in the present disclosure. In the present disclosure, the sign "/" may mean that all or some of the contents distinguished by "/" are included.

Multi-TRP (Transmission/Reception Point)

According to the Coordinated Multi Point (CoMP) technique, multiple BSs exchange (e.g., using X2 interface) or utilize channel information (e.g., RI/CQI/PMI/LI, etc.) feedbacked from UEs and perform cooperative transmission with UEs, and thereby controlling interference efficiently. The CoMP technique may be distinguished into Joint transmission (JT), Coordinated scheduling (CS), Coordinated beamforming (CB), DPS (dynamic point selection), DPB (dynamic point blacking), and the like according to the scheme to be used.

NCJT (Non-coherent joint transmission) may mean cooperative transmission not considering interference (i.e., without interference). For example, the NCJT may be a technique for a BS(s) to transmit data using the same time resource and frequency resource to a single UE through multiple TRPs. According to the technique, the multiple TRPs of the BS(s) may be configured to transmit data to the UE using different DMRS (demodulation reference signal) ports with each other through different layers. In other words, the NCJT may correspond to a transmission technique in which transmission of MIMO layer(s) is performed from two or more TRPs without adaptive precoding among TRPs.

The NCJT may be classified into fully overlapped NCJT scheme in which time resources and frequency resources used by each BS (or TRP) for transmission are fully overlapped and partially overlapped NCJT in which time resources and/or frequency resources used by each BS (or TRP) for transmission are partially overlapped. This is just for the convenience of description in the present disclosure, and the terms described above may be substituted by different term having the same technical meaning in the embodiments and methods to be described below. For example, in the case of the partially overlapped NCJT, in a part of time resources and/or frequency resources, all of data of a first BS (e.g., TRP 1) and data of a second BS (e.g., TRP 2) may be transmitted, and in the remaining time resources and/or frequency resources, data of either one of the first BS or the second BS may be transmitted.

The TRP forwards data scheduling information to the UE that receives NCJT using DCI (Downlink Control Information). In the aspect of DCI (Downlink Control Information) transmission, M-TRP (multiple TRP) transmission scheme may be classified into i) M-DCI (multiple DCI) based M-TRP transmission scheme in which each TRP transmits different DCI and ii) S-DCI (single DCI) based M-TRP transmission scheme in which a single TRP transmits DCI.

First, the single DCI based M-TRP transmission scheme is described. In the single DCI based M-TRP transmission scheme in which a representative TRP forwards scheduling information for data transmitted by the representative TRP itself and data transmitted by another TRP with single DCI, the MTRP performs cooperative transmission together with a common PDSCH, and each TRP participating in the cooperative transmission divides the corresponding PDSCH spatially with different layers (i.e., different DMRS ports) and transmits the divided PDSCH. In other words, the MTRP transmits a single PDSCH, but each TRP transmits a part of layer of multiple layers configuring a single PDSCH. For example, in the case that 4-layer data is transmitted, TRP 1 transmits 2 layers, and TRP 2 transmits the remaining 2 layers to the UE.

In this case, the scheduling information for the PDSCH is indicated to the UE through single DCI, and the DCI indicates that a certain QCL RS and QCL type information is used by a DMRS port (this is different from the previous scheme: QCL RS and TYPE to be commonly applied to all DMRS ports are indicated in DCI). That is, M TCI states are indicated through the TCI field in DCI (M=2, for 2 TRP cooperative transmission), and the QCL RS and type are identified by using different M TCI states for each of M DMRS port groups. Furthermore, DMRS port information may be indicated by using a new DMRS table.

In one example, for S-DCI, since all types of scheduling information for data transmitted by the MTRP is forwarded through single DCI, the S-DCI may be used in an ideal BH (ideal BackHaul) environment in which dynamic cooperation is possible between two TRPs.

Second, multiple-DCI based MTRP scheme is described. The MTRP transmits different DCI and a PDSCH (a UE receives N DCI and N PDSCHs from N TRPs), and the PDSCHs are transmitted in (partially or wholly) overlapping on a frequency-time resource. The PDSCH may be scrambling through different scrambling ID, and the DCI may be transmitted through Coreset belonging to different Coreset group groups (the Coreset group is identified by an index defined in Coreset configuration, e.g., when index=0 is configured for Coresets 1 and 2, and index=1 is configured for Coresets 3 and 4, Coresets 1 and 2 belong to Coreset group 0, and Coresets 3 and 4 belong to Coreset group. Further, in the case that an index is not defined in a Coreset, it is interpreted that index=0). In the case that a plurality of scrambling IDs is configured in one serving cell or two or more Coreset groups are configured, the UE may receive data in the multiple-DCI based MTRP operation.

In one example, whether the single-DCI based MTRP scheme or the multiple-DCI based MTRP scheme is applied may be indicated through separate signaling to the UE. For example, in the case that a plurality CRS patterns is indicated to the UE for MTRP operation for a single serving cell, PDSCH rate matching for CRS may be changed depending on whether the single-DCI based MTRP scheme or the multiple-DCI based MTRP scheme is applied.

The BS described in the present disclosure may collectively mean an object that performs data transmission/reception with the UE. For example, the BS described in the present disclosure may include one or more TPs (Transmission Points), one or more TRPs (Transmission and Reception Points), and the like. For example, the multiple TPs and/or multiple TRPs described in the present disclosure may be included in a single BS or multiple BSs. Furthermore, the TP and/or TRP may include a panel, a transmission and reception unit, and the like of the BS.

Furthermore, the TRP described in the present disclosure may mean an antenna array having one or more antenna elements available in a network located in a specific geographical location of a specific area. The present disclosure is described based on "TRP" for the convenience of description, but it is understood/applied that the TRP may be substituted by a BS, a TP (transmission point), a cell (e.g., macro cell/small cell/pico cell, etc.), an antenna array, or a panel.

Furthermore, the CORESET group ID described in the present disclosure may mean index/identification information (e.g., ID)/indicator for distinguishing CORESET configured/associated (or for each TRP/panel) for each TRP/panel. In addition, the CORESET group may be a group/union of CORESET distinguished by index/identification information (e.g., ID)/the CORESET group ID to distinguish CORESET. For example, the CORESET group ID may be specific index information defined in a CORSET configuration. For example, the CORESET group may be configured/indicated/defined by an index defined in the CORESET configuration for each CORESET. The CORESET group ID may be configured/indicated through higher layer signaling (e.g., RRC signaling)/L2 signaling (e.g., MAC-CE)/L1 signaling (e.g., DCI).

M-TRP Transmission Technique

The M-TRP transmission technique for which a plurality of (e.g., M) TRPs transmits data to a single User Equipment (UE) may be classified into two types: eMBB M-TRP (or M-TRP eMMB) transmission, which is a scheme for increasing transmission rate significantly, and URLLC M-TRP (or M-TRP URLLC) transmission, which is a scheme for increasing reception success rate and decreasing latency.

The URLLC M-TRP may mean a scheme that an M-TRP transmits the same TB (Transport Block) using different resource (e.g., layer/time resource/frequency resource, etc.). The UE configured with the URLLC M-TRP transmission scheme may indicated with several TCI states using DCI and assume that data received using a QCL RS (reference signal) of each TCI state is the same TB. On the other hand, the eMBB M-TRP may mean a scheme that an M-TRP transmits different TB using different resource (e.g., layer/time resource/frequency resource, etc.). The UE configured with the eMBB M-TRP transmission scheme may indicated with several TCI states using DCI and assume that data received using a QCL RS (reference signal) of each TCI state is different TB.

For example, the UE may distinguish and use an RNTI configured for MTRP-URLLC and an RNTI configured for MTRP-eMBB separately and may determine/decide whether the corresponding M-TRP transmission is URLLC transmission or eMBB transmission. That is, in the case that CRC masking of DCI received by the UE is performed by using the RNTI configured with MTRP-URLLC usage, this may correspond to URLLC transmission, and in the case that CRC masking of DCI is performed by using the RNTI configured with MTRP-URLLC usage, this may correspond to eMBB transmission.

Table 8 represents various schemes which may be considered for URLLC M-TRP transmission. Referring to Table 8, various schemes of SDM/FDM/TDM schemes are existed.

TABLE 8

To facilitate further down-selection for one or more schemes in RAN1#96bis, schemes for multi-TRP based URLLC, scheduled by single DCI at least, are clarified as following:
- Scheme 1 (SDM): n (n <= $N_s$) TCI states within the single slot, with overlapped time and frequency resource allocation
  ■ Scheme 1a:
  - Each transmission occasion is a layer or a set of layers of the same TB, with each layer or layer set is associated with one TCI and one set of DMRS port(s).
  - Single codeword with one RV is used across all spatial layers or layer sets. From the UE perspective, different coded bits are mapped to different layers or layer sets with the same mapping rule as in Rel-15.
  ■ Scheme 1b:
  - Each transmission occasion is a layer or a set of layers of the same TB, with each layer or layer set is associated with one TCI and one set of DMRS port(s).
  - Single codeword with one RV is used for each spatial layer or layer set. The RVs corresponding to each spatial layer or layer set can be the same or different.
  ■ Scheme 1c:
  - One transmission occasion is one layer of the same TB with one DMRS port associated with multiple TCI state indices, or one layer of the same TB with multiple DMRS ports associated with multiple TCI state indices one by one.
  ■ For Scheme 1a and 1c, the same MCS is applied for all layers or layer sets.
  ■ For scheme 1b, same or different MCS/modulation orders for different layers or layer sets can be discussed.
- Scheme 2 (FDM): n (n <= $N_f$) TCI states within the single slot, with non-overlapped frequency resource allocation
  ■ Each non-overlapped frequency resource allocation is associated with one TCI state.
  ■ Same single/multiple DMRS port(s) are associated with all non-overlapped frequency resource allocations.
  ■ Scheme 2a:
  - Single codeword with one RV is used across full resource allocation. From UE perspective, the common RB mapping (codeword to layer mapping) is applied across full resource allocation.
  ■ Scheme 2b:
  - Single codeword with one RV is used for each non-overlapped frequency resource allocation. The RVs corresponding to each non-overlapped frequency resource allocation can be the same or different.
  ■ For scheme 2a, same MCS is applied for all non-overlapped frequency resource allocations
  ■ For scheme 2b, same or different MCS/modulation orders for different non-overlapped frequency resource allocations can be discussed.
  ■ Details of frequency resource allocation mechanism for FDM 2a/2b with regarding to allocation granularity, time domain allocation can be discussed.
- Scheme 3 (TDM): n (n <= $N_{t1}$) TCI states within the single slot, with non-overlapped time resource allocation
  ○ Each transmission occasion of the TB has one TCI and one RV with the time granularity of mini-slot.
  ○ All transmission occasion (s) within the slot use a common MCS with same single or multiple DMRS port(s).
  ○ RV/TCI state can be same or different among transmission occasions.
  ○ FFS channel estimation interpolation across mini-slots with the same TCI index
- Scheme 4 (TDM): n (n <= $N_{t2}$) TCI states with K (n <= K) different slots.
  ○ Each transmission occasion of the TB has one TCI and one RV.
  ○ All transmission occasion (s) across K slots use a common MCS with same single or multiple DMRS port(s)
  ○ RV/TCI state can be same or different among transmission occasions.
  ○ FFS channel estimation interpolation across slots with the same TCI index Note that M-TRP/panel based URLLC schemes shall be compared in terms of improved reliability, efficiency, and specification impact.
Note:
Support of number of layers per TRP may be discussed Reliability Improvement Method in Multi-TRP FIG. 11 illustrates a transmission and reception method for reliability improvement supported by multiple TRPs, and the following two methods may be considered.

The example of FIG. 11 (a) shows the case that a layer group transmitting the same CW (codeword)/TB (transport block) corresponds to different TRPs. That is, the same CW may be transmitted through different layer/layer group. In this case, a layer group may mean a kind of layer set including one or more layers. As such, amount of transport resource increases as the number of layer increases, and through this, there is an advantage that robust channel coding of low coding rate may be used for a TB. In addition, since channels from multiple TRPs are different, reliability improvement of a reception signal may be expected based on diversity gain.

Meanwhile, the example of FIG. 11 (b) shows the case that different CWs are transmitted through a layer group corresponding to different TRPs. That is, different CW may be transmitted through different layer/layer group. In this case, it may be assumed that TBs corresponding to a first CW (CW #1) and a second CW (CW #2) are the same. Accordingly, this may be regarded as an example of a repeated transmission of the same TB. In the case of FIG. 11 (b), there is a disadvantage that coding rate corresponding to a TB may be higher than that of FIG. 11 (a) case. However, there is an advantage that coding rate may be adjusted by indicating different RV (redundancy version) values for encoding bits generated from the same TB depending on a channel environment, or a modulation order of each CW may be adjusted.

In FIG. 11 (a) or FIG. 11 (b), the same TB is repeatedly transmitted through different layer group and each layer group is transmitted by different TRP/panel, and data reception probability may be increased, which is referred to as URLLC M-TRP transmission scheme based on SDM (spatial division multiplexing). Layer(s) belonged to different layer group is respectively transmitted through DMRS ports belonged to different DMRS CDM groups.

Furthermore, the contents related to multiple TRPs described above may be extendedly applied to FDM (frequency division multiplexing) scheme based on different frequency domain resource (e.g., RB/PRB (set)) and/or TDM (time division multiplexing) scheme based on different time domain resource (e.g., slot, symbol, or sub-symbol) as well as the SDM (spatial division multiplexing) scheme that uses different layers.

Hereinafter, in the present disclosure, when cooperative transmission between multiple BSs (e.g., multiple TPs/TRPs of one or more BSs, etc.) and a UE (e.g., NCJT) is considered in a wireless communication system, the methods which may be proposed in the situation are described. Particularly, Proposal 1 proposes a method for configuring/defining a DMRS table which may be referenced in the case that multiple TCI states are indicated to a UE in URLLC transmission based on MTRP. Proposal 2 may define a new mapping rule such that all DMRS ports indicated to a UE may correspond to the same TCI state in the case that MTRP-URLLC operation is configured to a UE. Proposal 3 describes a method/rule for defining a mapping relation between TCI state and CDM group (/DMRS port). Proposal 4 proposes a method for indicating/configuring that a single user (SU) dedicated DMRS port combination may be used for multiple user (MU) usage. Proposal 5 proposes a method for determining the number of PTRS ports considering the case that multiple-TRP/panel transmission is performed.

The methods described in the present disclosure is described based on one or more TPs/TRPs of a BS(s), but it is understood that the method may also be applied to transmission based on one or more panels of a BS(s) in the same or similar manner.

<Proposal 1>

For URLLC operation, in the case that a UE is configured through higher layer signaling or succeeds in PDCCH decoding using a specific RNTI value, the UE may identify that the URLLC operation is configured/performed. Here, the URLLC operation means the MTRP-URLLC operation performed by M-TRPs described above. In the case that the URLLC operation is configured, the UE may be defined/configured to refer the same DMRS table as the DMRS table referred in the case that single TCI state is indicated even in the case that multiple TCI states are indicated in a TCI state field in DCI.

In the present disclosure, the TCI state field in DCI means 'Transmission configuration indication (TCI)' field. In addition, the fact that multiple TCI states are indicated in a TCI state field in DCI may be interpreted that a code point of 'Transmission configuration indication (TCI)' field in DCI indicates multiple TCI states or may be mapped/corresponded to multiple TCI states.

As an example of higher layer configuration of URLLC operation, a method of using higher layer parameter 'pdsch-AggregationFactor' may be considered. In Rel-15, 'pdsch-AggregationFactor' is a higher layer parameter indicating the number of repetitions for data, and a repeated transmission of the same TB (transport block) through a consecutive slot corresponding to 'pdsch-AggregationFactor' may be configured to the UE. The parameter may be used for a parameter for indicating multiple TRP based URLLC operation in Rel-16.

As an example of the specific RNTI value for configuring URLLC operation, MCS (Modulation and Coding Scheme)-C-RNTI may be exemplified. MCS-C-RNTI may be used for the usage of indicating the UE to refer a specific MCS index table (e.g., 3gpp TS 38.214 Table 5.1.3.1-3). For example, when receiving a PDSCH scheduled by a PDCCH including CRC scrambled with MCS-C-RNTI, the UE may determine a modulation order and a target code rate used for a PDSCH based on the specific MCS index table. The MCS table is characterized to be configured with an MCS combination in which relatively conservative transmission is available. The conservative transmission may mean the case that stable data transmission is available for the UE with low error rate even in the case of low SNR since a coding rate of channel coding is low or a modulation order is low. Accordingly, the MCS-C-RNTI value may be used for the purpose of reliability improvement and utilized for the usage of indicating URLLC operation to the UE.

The examples of configuring URLLC using higher layer configuration or specific RNTI are just examples for the convenience of description, and not intended to limit the technical scope of the present disclosure. Accordingly, other higher layer parameter or RNTI may be used for the URLLC operation configuration. In the case that the UE is configured through higher layer parameter (e.g., pdsch-AggregationFactor) or succeeds in PDCCH decoding using a specific RNTI value (e.g., MCS-C-RNTI), the UE may identify that data is transmitted based on one of the MTRP based URLLC operation schemes (e.g., SDM, FDM, or CDM, etc.) described in Table 8.

Together with the indication of URLLC operation to the UE based on a higher layer configuration or a specific RNTI, a TCI state field in DCI may be used to indicate TCI state(s) corresponding to multiple TRPs to the UE. Particularly, a specific code point of the TCI state field may correspond to/be mapped to multiple TCI states. In one example, in the case that a TCI state field of DCI configured with 3 bits is assumed, the first code point '000' may correspond to/be mapped to {TCI state A, TCI state B} configured with two TCI states.

As described above, in the case that URLLC operation is configured/indicated to the UE and multiple TCI states is indicated through a specific code point of a TCI state field of DCI, the UE may refer the same DMRS table as the DMRS table referred in the case that a single TCI state is indicated. For example, the DMRS table referable by the UE in the case that a single TCI state is indicated may be the DMRS table defined in Rel-15 NR standard (e.g., 3gpp TS38.212 Table 7.3.1.2.2-1/2/3/4, etc.).

Table 9 is an example of the DMRS table referable by the UE in the case that a single TCI state is indicated and represents 3gpp TS38.212 Table 7.3.1.2.2-1 standard. Table 9 is an example of the case that antenna port(s) (1000+DMRS port), dmrs-type=1, and maxlength=1.

TABLE 9

| | One Codeword: Codeword 0 enabled, Codeword 1 disabled | |
| --- | --- | --- |
| Value | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |

TABLE 9-continued

One Codeword:
Codeword 0 enabled,
Codeword 1 disabled

| Value | Number of DMRS CDM group(s) without data | DMRS port(s) |
|---|---|---|
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

In the case of operating in the scheme above, there is an advantage below.

In the case that multiple TCI states are indicated through a specific code point of a TCI state field in DCI, a DMRS table may be defined, which may be optimized for NCJT transmission for eMBB may be defined.

In the case that multiple TCI states are indicated through a specific code point to the UE in Rel-16, a new DMRS table, which is different from the DMRS table defined in Rel-15, may be defined. However, in the case that URLLC transmission based on multiple TRPs is going to be supported, the DMRS table defined in Rel-15 is referred, and a DMRS port combination for NCJT transmission for eMBB may be defined with more optimized in detail.

As another method, the UE configured with a higher layer configuration for URLLC operation or succeeding in PDCCH decoding through a specific RNTI value may be defined/configured to refer a DMRS table configured with a subset of a DMRS port combination defined in Rel-15 DMRS table, in the case that multiple TCI states are indicated in a TCI state field in DCI.

Since high reliability is required for the UE operating in URLLC, it is highly probable that the number of transmission layers is limited. In this case, a DMRS port combination for the number of layers that exceeds a specific number of layers among the DMRS port combination defined in Rel-15 DMRS table may not be used. The specific number of layers may be configured to the UE by the BS through a higher layer configuration or defined as a promised value between the BS and the UE in advance. In the case that the DMRS port combination for the number of layers that exceeds a specific number of layers is not used, a new DMRS table may be configured with a subset form (e.g., a part of state/row/column/entry, etc. among the predefined DMRS table) including layers of the number of specific layers or smaller in Rel-15 DMRS table (e.g., 3gpp TS38.212 Table 7.3.1.2.2-1/2/3/4).

Table 10 represents an example of a DMRS table which may be applied to the case that the UE is configured such that the DMRS port combination for the number of layers that exceeds 2 layers is not used. Table 10 is just an example for the convenience of description but not intended to limit the technical scope of the present disclosure.

TABLE 10

| One Codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0-15 | reserved | reserved | reserved |
| 1 | 1 | 1 | 1 | | | | |
| 2 | 1 | 0, 1 | 1 | | | | |
| 3 | 2 | 0 | 1 | | | | |
| 4 | 2 | 1 | 1 | | | | |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0, 2 | 1 | | | | |
| 10 | 2 | 0 | 2 | | | | |
| 11 | 2 | 1 | 2 | | | | |
| 12 | 2 | 2 | 2 | | | | |
| 13 | 2 | 3 | 2 | | | | |
| 14 | 2 | 0, 4 | 2 | | | | |
| 15 | 2 | 2, 6 | 2 | | | | |

Table 10 represents an example configured with a subset form of Table 7.3.1.2.2-2 of 3gpp TS38.212. In the conventional DMRS table, 0 to 31 values are present, and 5 bits are required to indicate the values. In Table 10, a subset is configured with a DMRS port combination corresponding to a part of values of the conventional DMRS table and 0 to 15 values are present, and 4 bits may be required to indicate the values.

In the example of Table 10, considering multiple user (MU) pairing, the number of total transmission layers does not exceed 4 in the aspect of BS. This has a disadvantage that a part of DMRS port combination is unusable in the case that the number of front-load symbols is 2. However, in the URLLC aspect, since reliability improvement of a specific UE is important, 2-symbol front-load DMRS may be used for the purpose of channel estimation performance improvement, and a part of combination may be excluded. In the case of 2-symbol front-load DMRS, the reception power of DMRS may be improved. Particularly, in the case of the combination in which values of the table correspond to 14 and 15, since the UE may not expect CDM in frequency domain, there is an advantage that channel estimation performance may be improved in a channel environment in which frequency selectivity property is great.

As such, in the case that a new DMRS table of subset form is defined, a bit number of a DCI field required for DMRS port indication may be decreased, and the decreased bit may be used for other purpose. For example, when URLLC operation may operate based on FDM and/or TDM, the decreased bit may be used for the purpose of selecting URLLC operation based on FDM and/or TDM.

As a similar method to the proposal, in the case that the UE is configured through higher layer for URLLC operation and/or the UE that succeeds in PDCCH decoding using a specific RNTI value is indicated with multiple TCI states in a TCI state field in DCI, the UE may not expect an indication for a specific state in the Rel-15 DMRS table. That is, the UE may not expect an indication for a state that corresponds to the number of layers that exceeds a specific number of layers. In this case, the specific number of layers may be configured to the UE by the BS through a higher layer configuration or defined as a promised value between the BS and the UE in advance. In addition, the specific number of layers may be differently defined/configured depending on a DMRS table configured to the UE (e.g., 3gpp TS38.212 Table 7.3.1.2.2-1/2/3/4, etc.).

<Proposal 2>

For URLLC operation, in the case that a UE is configured through higher layer signaling or succeeds in PDCCH decoding using a specific RNTI value, the UE may identify that the URLLC operation is configured/performed. Here, the URLLC operation means the MTRP-URLLC operation performed by M-TRPs described above. In the case that the URLLC operation is configured and in the case that multiple TCI states are indicated in a TCI state field in DCI to the UE, each state may correspond to a specific time/frequency resource, and in this case, all DMRS ports indicated to the UE may correspond to the same TCI states. The time/frequency resource in Proposal 2 of the present disclosure may be interpreted as a time resource, a frequency resource, or a time and frequency resource.

In Rel-16, for at least eMBB, TCI indication framework needs to be improved. Each TCI code point in DCI may correspond to 1 or 2 TCI states. When 2 TCI states are activated within a TCI code point, each TCI state corresponds to one CDM group, at least for DMRS type 1.

In other words, in the case that two TCI states are indicated, each TCI state corresponds to a specific CDM group. That is, different TCI states may correspond to DMRS port groups of different CDM groups. This is introduced for the purpose of minimizing mutual interference in channel estimation in the case that different TRPs transmit data through overlapped time/frequency resource domain, when eMBB transmission is assumed. That is, the situation in which different TRPs use overlapped time/frequency resource domain is assumed.

However, in the case that multiple TRP-based URLLC operation is performed, different TRPs transmit data through different (i.e., not overlapped) time/frequency resource domains. In addition, the TRP that transmits data using a specific time/frequency resource domain may transmit data using all indicated DMRS ports. In this case, a specific TCI state needs to be corresponded in a specific time/frequency resource domain units, and all DMRS ports indicated to the UE need to correspond to the same TCI state. Accordingly, in the case that URLLC operation is configured/indicated to the UE, the conventional eMBB case is not followed, but a new rule needs to be defined such that all DMRS ports indicated to the UE correspond to the same TCI state.

<Proposal 3>

Table 11 and Table 12 represent examples of parameters for each PDSCH DMRS configuration type of 3gpp TS38.211 7.4.1.1 standard. Table 11 represents parameters for PDSCH DMRS configuration type 1, and Table 12 represents parameters for PDSCH DMRS configuration type 2. The value p in Table 11 and Table 12 is equal to the DMRS port value plus 1000. Through the contents described in Table 11 and Table 12, and Demodulation reference signals for PDSCH of 3gpp TS38.211 7.4.1.1 standard, a correspondence relation between a DMRS port and a CDM group may be identified.

TABLE 11

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 12

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

In addition, based on a value of antenna port(s) field indicated through DCI in 3gpp TS38.212 7.3.1.2.2. Format1_1, the number of DMRS CDM groups and the configuration of DMRS port may be identified. For example, through the antenna port(s) field of DCI, the state/value defined in Tables 7.3.1.2.2-1/2/3/4 may be indicated, and 'the number of CDM groups without data' values, 1, 2, and 3 in the table (e.g., 3gpp TS38.212 Tables 7.3.1.2.2-1/2/3/4) may mean CDM group {0}, {0,1}, and {0,1,2}, respectively. Antenna ports {p0, . . . , pv−1} may be determined according to an order of DMRS port(s) given by the table (e.g., 3gpp TS38.212 Tables 7.3.1.2.2-1/2/3/4).

Furthermore, the UE may assume that (based on QCL assumption), different TRPs correspond to different CDM groups. Accordingly, when the UE receives PDSCH(s) from an M-TRP, the UE may distinguish each TRP through a CDM group and may perform the multiple-TRP related operation (e.g., MTRP-URLLC related operation in Table 8) described above.

Hereinafter, in the case that multiple TCI states are indicated in a TCI state field in DCI to the UE, a method/rule for defining a mapping relation between each TCI state and CDM group (/DMRS port) is described.

Alt 1: A TCI state indicated to the UE may be orderly and sequentially mapped to a CDM group. For example, a rule may be defined between the BS and the UE such that the first TCI state corresponds to CDM group #0, and the second TCI state corresponds to CDM group #1. In the case that three or more TCI states and three or more CDM groups are indicated to the UE, a CDM group may be sequentially mapped to a TCI state according to an index order of the CDM groups. For example, in the case that TCI states 1,2, and 3 are indicated to the UE and CDM groups 0,1, and 2 are indicated to the UE, TCI state 1 may correspond to CDM group 0, TCI state 2 may correspond to CDM group 1, and TCI state 3 may correspond to CDM group 3.

In addition, while an order of TCI state configured to the UE is fixed, it may be defined such that the total number of layers are the same but the number of layers corresponding to each CDM group is different to support a combination of the number of layers corresponding to each TRP in various manners.

Table 13 represent an example of a DMRS table in which the total number of layers corresponding to each TRP are the same but the number of layers corresponding to each CDM group is different. In Table 13, the case in which dmrs-Type=1 and maxLength=2 is assumed.

TABLE 13

| | One Codeword: Codeword 0 enabled, Codeword 1 disabled | | |
|---|---|---|---|
| Value | Number of DMRS CDM group(s) without data | DMRS port(s) | Mumber of front-load symbols |
| 0 | 2 | 0, 1, 6 | 2 |
| 1 | 2 | 2, 3, 4 | 2 |

Referring to Table 13, a combination of the number of layers for CDM group #0: CDM group #1 is (2:1) in the case that 'value' is 0, and (1:2) in the case that 'value' is 1. This has an advantage that an order of a TCI state may be fixedly configured to the UE (e.g., {TCI state #1, TCI state #2}), and various layer combinations, that is, (2:1) or (1:2) may be supported through a DMRS port indication.

However, in the case that multiple-user (MU) together with multiple-TRP transmission are assumed, a problem may occur in Alt 1 scheme, that is, the scheme that the first TCI state fixedly corresponds to CDM group #0, and the second TCI state fixedly corresponds to CDM group #1. For example, in the case that only {TCI state #1, TCI state #2} is configured to both UE 1 and UE 2, and UE 1 and UE 2 are intended to receive data from TRP #1 (TCI state #1) and TRP #2 (TCI state #2) in (2:1) layer combination, the corresponding transmission may not be performed according to the DMRS table (e.g., Table 13).

In order to solve the problem described above, additional TCI states such as {TCI state #2, TCI state #1} need to be configured to all UEs, but overhead increases due to the additional TCI state configuration. Hereinafter, Alt 2 proposes a method for solving the problem without additional TCI state configuration in the case that multiple-user (MU) together with multiple-TRP transmission are assumed.

Alt 2: In the case that multiple TCI states are indicated in a TCI state field in DCI to the UE, a CDM group order may be implicitly indicated to the UE according to orders of DMRS ports indicated to the UE. For example, a part or the whole DMRS port(s) among the DMRS ports corresponding to the same CDM group may be referred to as a DMRS port set, and a DMRS port(s) combination indicated to the UE based on a DMRS table may be defined as multiple DMRS port sets in a unit of the DMRS port set. The CDM group order of Alt 2 may be the same as the order of the CDM group corresponding to the DMRS port set indicated to the UE, and each TCI state may sequentially correspond to the CDM group order.

Table 14 represents an example of a new DMRS table considering multiple-TRP transmissions and multiple users to which the present proposed method is applicable. Table 14 is just an example for the convenience of description, and not intended to limit the technical scope of the present disclosure.

TABLE 14

| | One Codeword: Codeword 0 enabled, Codeword 1 disabled | | |
|---|---|---|---|
| Value | Number of DMRS CDM group(s) without data | DMRS port(s) | Number of front-load symbols |
| 0 | 2 | 0, 1, 6 | 2 |
| 1 | 2 | 2, 3, 4 | 2 |
| 2 | 2 | 6, 0, 1 | 2 |
| 3 | 2 | 4, 2, 3 | 2 |

Referring to Table 14, 'Value' 0 or 2 indicates the same DMRS port but the explicit order is different. In the case that 'Value' is 0 or 3, there is an effect that an order for CDM group #0 and CDM group #1 is indicated through the order of DMRS port, and in the case that 'Value' is 1 or 2, there is an effect that an order for CDM group #1 and CDM group #0 is indicated through the order of DMRS port. Furthermore, in the case that 'Value' is 0 or 3, the first TCI state may be mapped to CDM group #0 indicated as the first CDM group, and the second TCI state may be mapped to CDM group #1 indicated as the second CDM group, through the order of DMRS port. On the other hand, in the case that 'Value' is 1 or 2, the first TCI state may be mapped to CDM group #1 indicated as the first CDM group, and the second TCI state may be mapped to CDM group #0 indicated as the second CDM group, through the order of DMRS port.

That is, in the case that multiple TCI states are indicated, the first TCI state may correspond to the first CDM group, and the second TCI state may correspond to the second CDM group, through the order of DMRS port. In the case that such an operation is available, when value 0 is indicated to UE 1 and value 1 is indicated to UE 2, both UE 1 and UE 2 may simultaneously receive data from TRP #1 (TCI state #1) by 2 layers and from TRP #2 (TCI state #2) by 1 layer (i.e., MU state).

In other words, a part or the whole DMRS port(s) among the DMRS ports corresponding to the same CDM group may be referred to as a DMRS port set, and a DMRS port(s) combination indicated to the UE based on a DMRS table may be defined as multiple DMRS port sets in a unit of the DMRS port set. The CDM group order of the proposal may be the same as the order of the CDM group corresponding to the DMRS port set indicated to the UE, and each TCI state may sequentially correspond to the CDM group order.

For example, a case that {TCI state A, TCI state B} is indicated to the UE may be assumed. In the case that DMRS port 0 (CDM group 0), 1 (CDM group 0), and 6 (CDM group 1) are indicated to the UE, DMRS port 0/1 may be referred to as the first DMRS port, and the corresponding CDM group 0 may be referred to as the first CDM group. Furthermore, DMRS port 6 may be referred to as the second DMRS port, and the corresponding CDM group 1 may be referred to as the second CDM group. Accordingly, the first TCI state, TCI state A may correspond to CDM group 0, the first CDM group (or DMRS port(s) included in CDM group 0), and the second TCI state, TCI state B may correspond to CDM group 1, the second CDM group (or DMRS port(s) included in CDM group 1).

On the contrary, in the case that DMRS port 6 (CDM group 1), 0 (CDM group 0), and 1 (CDM group 0) are indicated to the UE, DMRS port 6 may be referred to as the first DMRS port, and the corresponding CDM group 1 may be referred to as the first CDM group. Furthermore, DMRS port 0/1 may be referred to as the second DMRS port, and the corresponding CDM group 0 may be referred to as the second CDM group. Accordingly, the first TCI state, TCI state A may correspond to CDM group 1, the first CDM group (or DMRS port(s) included in CDM group 1), and the second TCI state, TCI state B may correspond to CDM group 0, the second CDM group (or DMRS port(s) included in CDM group 0).

In addition, the scheme may also be applied to the case of 2-codeword (CW) (e.g., first CW and second CW). Table 15 represents an example of a DMRS table for 2CW transmission. In Table 15, the case that dmrs-Type=1 and max-Length=2 is assumed.

TABLE 15

Two Codewords:
Codeword 0 enabled,
Codeword 1 enabled

| Value | Number of DMRS CDM group(s) without data | DMRS port(s) | Number of front-load symbols |
|---|---|---|---|
| 0 | 2 | 2, 3, 0, 1, 4 | 2 |
| 1 | 2 | 0, 1, 2, 3, 5 | 2 |

Referring to Table 15, in the case that 'Value' is 0, there is an effect that an order for CDM group #1 and CDM group #0 is indicated through the order of DMRS port, and in the case that 'Value' is 1, there is an effect that an order for CDM group #0 and CDM group #1 is indicated through the order of DMRS port. Furthermore, in the case that 'Value' is 0, the first TCI state may be mapped to CDM group #1 indicated as the first CDM group, and the second TCI state may be mapped to CDM group #0 indicated as the second CDM group, through the order of DMRS port. On the other hand, in the case that 'Value' is 1, the first TCI state may be mapped to CDM group #0 indicated as the first CDM group, and the second TCI state may be mapped to CDM group #1 indicated as the second CDM group, through the order of DMRS port.

Meanwhile, in 2-CW case, the number of DMRS ports in a CDM group indicated as the first CDM group and the number of DMRS ports in a CDM group indicated as the second CDM group are fixed to a specific number. The specific number may be changed depending on the total number of transmission layers. This is the property that needs to be considered since the TCI states are sequentially mapped to layers according to an order of the DMRS port indicated to the UE. In addition, in 2-CW transmission case, different CWs may correspond to different TRPs (i.e., TCI states). This is because a transmission most proper to a channel for each TRP may be performed for each CW.

As represented in the example of Table 15 above, for 5-layer transmission, the number of layers mapped to each CW is fixed to 2 layers and 3 layers with respect to a first CW (CW #0) and a second CW (CW #1), respectively. Accordingly, the number of DMRS ports in a CDM group indicated as the first CDM group needs to be fixed to 2 layers, and the number of DMRS ports in a CDM group indicated as the second CDM group needs to be fixed to 3 layers. The fixed combination of the number of layers described above may be defined as (the number of DMRS ports in the first CDM group:the number of DMRS ports in the second CDM group). For example, in the case of the whole number of transmission layers 6, 7, and 8, the combination may be defined as (3:3), (3:4), and (4:4), respectively.

First Embodiment

In the case that multiple TCI states are indicated in a TCI state field in DCI to the UE, a CDM group order may be implicitly indicated to the UE according to orders of DMRS ports indicated to the UE. For example, an order of the CDM group may be determined according to the first DMRS port among the DMRS ports indicated to the UE through a DMRS table. That is, the CDM group including the first DMRS port among the DMRS ports indicated to the UE through a DMRS table or the CDM group corresponding to the first DMRS port may be defined as the first CDM group, and the remaining CDM group(s) (including the remaining DMRS port(s)/corresponding CDM group(s)) may be defined as the second CDM group(s). The DMRS ports corresponding to the first CDM group may correspond to the first TCI state, and the DMRS ports corresponding/related to the second CDM group(s) may correspond to the second TCI state.

Table 16 to Table 19 represent examples that an order of CDM group is determined according to an (indication) order of a DMRS port. Table 16 to Table 19 represent examples of the first CDM group and the second CDM group for a DMRS port combination to which 2 CDM groups are indicated based on the DMRS table defined in TS38.212 and Table 7.4.1.1.2-1/2 (Table 11 and Table 12 above) defined in TS 38.211.

TABLE 16

Based on table 7.3.1.2.2.-1 in TS38.212,
One Codeword

| Value | DMRS port(s) | the first indicated CDM group | the second indicated CDM group |
|---|---|---|---|
| 9 | 0-2 | CDM group 0 | CDM group 1 |
| 10 | 0-3 | CDM group 0 | CDM group 1 |
| 11 | 0, 2 | CDM group 0 | CDM group 1 |

TABLE 17

| Based on table 7.3.1.2.2.-2 in TS38.212, One Codeword | | | | Based on table 7.3.1.2.2.-2 in TS38.212, Two Codeword | | | |
|---|---|---|---|---|---|---|---|
| Value | DMRS port(s) | the first indicated CDM group | the second indicated CDM group | Value | DMRS port(s) | the first indicated CDM group | the second indicated CDM group |
| 9 | 0-2 | CDM group 0 | CDM group 1 | 0 | 0-4 | CDM group 0 | CDM group 1 |
| 10 | 0-3 | CDM group 0 | CDM group 1 | 1 | 0, 1, 2, 3, 4, 6 | CDM group 0 | CDM group 1 |
| 11 | 0, 2 | CDM group 0 | CDM group 1 | 2 | 0, 1, 2, 3, 4, 5, 6 | CDM group 0 | CDM group 1 |
| 30 | 0, 2, 4, 6 | CDM group 0 | CDM group 1 | 3 | 0, 1, 2, 3, 4, 5, 6, 7 | CDM group 0 | CDM group 1 |

TABLE 18

| Based on table 7.3.1.2.2.-3 in TS38.212, One Codeword | | | |
|---|---|---|---|
| Value | DMRS port(s) | the first indicated CDM group | the second indicated CDM group |
| 9 | 0-2 | CDM group 0 | CDM group 1 |
| 10 | 0-3 | CDM group 0 | CDM group 1 |
| 20 | 0-2 | CDM group 0 | CDM group 1 |
| 21 | 3-5 | CDM group 1 | CDM group 2 |
| 22 | 0-3 | CDM group 0 | CDM group 1 |
| 23 | 0, 2 | CDM group 0 | CDM group 1 |

TABLE 19

| Based on table 7.3.1.2.2.-4 in TS38.212, One Codeword | | | | Based on table 7.3.1.2.2.-4 in TS38.212, Two Codeword | | | |
|---|---|---|---|---|---|---|---|
| Value | DMRS port(s) | the first indicated CDM group | the second indicated CDM group | Value | DMRS port(s) | the first indicated CDM group | the second indicated CDM group |
| 9 | 0-2 | CDM group 0 | CDM group 1 | 2 | 0, 1, 2, 3, 6 | CDM group 0 | CDM group 1 |
| 10 | 0-3 | CDM group 0 | CDM group 1 | 3 | 0, 1, 2, 3, 6, 8 | CDM group 0 | CDM group 1 |
| 20 | 0-2 | CDM group 0 | CDM group 1 | 4 | 0, 1, 2, 3, 6, 7, 8 | CDM group 0 | CDM group 1 |
| 21 | 3-5 | CDM group 1 | CDM group 2 | 5 | 0, 1, 2, 3, 6, 7, 8, 9 | CDM group 0 | CDM group 1 |
| 22 | 0-3 | CDM group 0 | CDM group 1 | | | | |
| 23 | 0, 2 | CDM group 0 | CDM group 1 | | | | |

Referring to Table 16 to Table 19, in the DMRS port combination, the CDM group corresponding to the first DMRS port may be determined to be the first CDM group.

For example, two types of DMRS port combination (0,1,2) and (2,0,1) is configured with the same DMRS ports, but the order of indicated CDM group may be different. The CDM groups included in/corresponding to DMRS port (0, 1, 2) and (2, 0, 1) are the same as CDM group 0 and CDM group 1, respectively (refer to Table 11 and Table 12), but the first DMRS port is different as 0 and 2. Accordingly, the group order may be differently indicated/configured such that the first CDM group of the first DMRS port combination (i.e., (0,1,2)) is CDM group 0 that corresponds to the first DMRS port 0, and the first CDM group of the second DMRS port combination (i.e., (2, 0, 1)) is CDM group 1 that corresponds to the first DMRS port 2.

Accordingly, in the case of the DMRS port combination (0,1,2), DMRS ports 0, 1, which are DMRS port(s) of CDM group 0 may correspond to the first TCI state, and DMRS port 2 corresponding to CDM group 1 may correspond to the second TCI state. On the other hand, in the case of the DMRS port combination (2,0,1), DMRS ports 2, which is DMRS port of CDM group 1 may correspond to the first TCI state, and DMRS ports 0, 1, which are DMRS port(s) of CDM group 0 may correspond to the second TCI state.

For example, as described above, it may be indicated/configured/promised that when the number of CDM groups is 3, the DMRS port(s) included in/corresponding to the CDM group corresponding to the DMRS port may correspond to the first TCI state, and the DMRS ports included in/corresponding to the remaining two CDM groups may correspond to the second TCI state.

As described in Alt 2 and the first embodiment, for each of the DMRS port combinations configured with the same DMRS ports, different CDM group order may be indicated based on the orders of DMRS ports, and therefore, a mapping relation between a TCI state and a DMRS port and a mapping relation between a TCI state and a CDM group may be changed.

Meanwhile, layer $x(i)=[x^{(0)}(i) \ldots x^{(\upsilon-1)}(i)]^T$, $i=0, 1, \ldots, M_{symb}^{layer}-1$ is mapped to antenna ports according to Equation 5. Herein, v represents the number of layers, and $M_{symb}^{layer}$ represents the number of modulation symbols per layer.

$$\begin{bmatrix} y^{(p_0)}(i) \\ \vdots \\ y^{(p_{o-1})}(i) \end{bmatrix} = \begin{bmatrix} x^{(0)}(i) \\ \vdots \\ x^{(o-1)}(i) \end{bmatrix} \text{ where } i = 0, 1, \ldots, M_{symb}^{ap}-1, M_{symb}^{ap} = M_{symb}^{layer}$$ [Equation 5]

The set $\{p_0 \ldots, p_{\upsilon-1}\}$ of antenna ports may be determined according to the procedure of [TS 38.212]. That is, the set may be sequentially mapped to layers according to orders of DMRS ports indicated to the UE through a DMRS table.

Considering Equation 5, two types of DMRS port combination (0,1,2) and (2,0,1) is configured with the same DMRS ports, but a mapping relation between a DMRS port and a layer may be different. For example, the first DMRS port combination (i.e., (0,1,2)) is mapped to number 0, 1, and 2 layer, respectively, according to the DMRS port order of number 0, 1, and 2, but the second DMRS port combination (i.e., (2, 0, 1)) is mapped to number 0, 1, and 2 layer, respectively, according to the DMRS port order of number 2, 0, and 1. In this case, in the aspect of UE implementation, different DMRS port to layer mapping relations need to be defined.

Assuming that the two different types of DMRS port combination is intended to indicate different mapping relation between DMRS ports and TCI states, it may be defined that the mapping relation between DMRS ports and layers is the same. That is, in the case that orders of DMRS ports indicated through a DMRS table is different, but the DMRS ports included in the DMRS port combination are the same, it may be defined that the same DMRS port to layer mapping relation is assumed even for different DMRS port combination.

For example, regardless of the order in which DMRS ports are indicated, the DMRS port of low index may be mapped from a layer of low index sequentially. That is, in the above example, it may be assumed that DMRS port n is mapped to layer n. As a specific example, for two types of DMRS port combination (0,1,2) and (2,0,1), there is a specific mapping relation of DMRS port to layer, and an assumption of mapping relation of DMRS port to layer may be defined/configured such that DMRS port 0 corresponds to layer 0, DMRS port 1 corresponds to layer 1, and DMRS port 2 corresponds to layer 2.

As such, when DMRS ports configuring a DMRS port combination are the same, in the case that the same mapping relation of DMRS port to layer is assumed without regard to orders of DMRS ports configuring a DMRS port combination, the UE may not implement an additional mapping relation of DMRS port to layer, and accordingly, UE implementational complexity may be decreased.

Furthermore, in the case that three or more TCI states and three or more CDM groups are indicated to the UE, a mapping relation between a TCI state and a CDM group (i.e., DMRS port(s)) may be determined according to an order of DMRS port which is firstly present in each CDM group based on orders of DMRS ports in a DMRS port combination indicated to the UE.

For example, in the case that TCI states 1, 2, and 3 are indicated to the UE and DMRS ports 2, 3, 0, 1, 4, and 5 (assuming type 2 DMRS) are indicated, a mapping relation between a TCI state and a CDM group may be determined according to an order among 2, 0, and 4, which are DMRS ports firstly present in each CDM group. That is, TCI state 1 may correspond to CDM group 1, which is the first CDM group that corresponds to the first DMRS port 2. TCI state 2 may correspond to CDM group 0, which is the second CDM group, and TCI state 3 may correspond to CDM group 2, which is the third CDM group.

Alt 3: In the case that multiple TCI states are indicated in a TCI state field in DCI to the UE, the CDM group of the lowest (or highest) index among the CDM groups indicated to the UE may correspond to the first TCI state, and the remaining TCI group may correspond to the second TCI state. Alternatively, the CDM group of the lowest (or highest) index among the CDM groups indicated to the UE may correspond to the second TCI state, and the remaining TCI group may correspond to the first TCI state. That is, it may be configured/indicated/promised such that the DMRS port(s) included in a CDM group of the lowest (or highest) index among the CDM groups indicated by the DMRS port(s) (corresponding to the DMRS port) indicated to the UE may correspond to the first (or second) TCI state, and the DMRS port(s) corresponding to the remaining CDM group among the DMRS port(s) may correspond to the second (first) TCI state.

As a specific example, for two different types of DMRS port combination (0,1,2) and (2,0,1), the CDM group of the lowest index is CDM group 0 for both the first combination (e.g., (0, 1, 2)) and the second combination (e.g., (2, 0, 1)). Accordingly, in both two combinations, the first CDM group may correspond to CDM group 0, and the second CDM group may correspond to CDM group 1. In addition, in both two combinations, the DMRS port corresponding to the first TCI state is 0 and 1, and the DMRS port corresponding to the second TCI state is 2.

On the other hand, for two different types of DMRS port combination (0,1,2) and (2,0,1), the CDM group of the lowest index is CDM group 0 for both the first combination (e.g., (0, 1, 2)) and the second combination (e.g., (2, 0, 1)), and accordingly, in both two combinations, the first CDM group may correspond to CDM group 0, and the second CDM group may correspond to CDM group 1. In the first combination, the DMRS port of CDM group 0 corresponding to the first TCI state is 0 and 1, and the DMRS port of CDM group 1 corresponding to the second TCI state is 2. On the other hand, in the second combination, the DMRS port of CDM group 0 corresponding to the first TCI state is 1, and the DMRS port of CDM group 1 corresponding to the second TCI state is 2 and 3. In this case, using different DMRS port combinations, the case that the number of DMRS ports corresponding to each TCI state is different may be supported.

Furthermore, the mapping relation of DMRS port to layer may also be applied to Alt 3. For example, regardless of the order in which DMRS ports are indicated, the DMRS port of low index may be mapped from a layer of low index sequentially.

<Proposal 4>

I may be indicated/configured that A single user (SU) dedicated DMRS port combination among the DMRS port combination in Rel-15 DMRS table may be used for multiple-user (MU) usage through implicit or explicit DCI signaling and/or higher layer signaling.

In Rel-15 TS 38.214 5.1.6.2 section, the single user (SU) dedicated DMRS port combination is described as represented in Table 20.

TABLE 20

For DM-RS configuration type 1,
- if a UE is scheduled with one codeword and assigned with the antenna port mapping with indices of {2, 9, 10, 11 or 30} in Table 7.3.1.2.2-1 and Table 7.3.1.2.2-2 of Subclause 7.3.1.2 of [5, TS 38.212], or
- if a UE is scheduled with two codewords,
the UE may assume that all the remaining orthogonal antenna ports are not associated with transmission of PDSCH to mother UE.
For DM-RS configuration type 2,
- if a UE is scheduled with one codeword and assigned with the antenna port mapping with indices of {2, 10 or 23} in Table 7.3.1.2.2-3 and Table 7.3.1.2.2-4 of Subclause 7.3.1.2 of [5, TS38.212], or TABLE 20-continued

- if a UE is scheduled with two codewords,
the UE may assume that all the remaining orthogonal antenna ports are not associated with transmission of PDSCH to another UE.

Referring to Table 20, the "SU dedicated DMRS port combination among the DMRS port combination in Rel-15 DMRS table" may mean a DMRS port combination in which the DMRS port(s) excluding the DMRS port(s) allocated to the UE is not allocated another UE except the UE within the CDM group(s) to which the DMRS port(s) allocated to the UE belongs. For example, for DMRS configuration type 1 case, the DMRS port(s) corresponding to {2,9,10,11,30} value in the DMRS table may be a SU dedicated DMRS port combination.

In the proposal, "may be used for multiple-user (MU) usage" may mean a situation in which a DMRS port except the DMRS port allocated to the specific UE may not be allocated to another UE except the specific UE, that is, may be allocated to another UE. In the case that "SU dedicated DMRS port combination may be used for MU usage" is indicated/configured, the operation change may occur in the aspect of UE.

In the case that the UE may know SU dedicated DMRS port combination, CDM may not be considered in channel estimation. This means that it may be not considered that different DMRS ports are multiplexed in time domain and/or frequency domain using an orthogonal sequence. In the case of not considering CDM, the UE may utilize all reference signals received in time domain and/or frequency domain for interpolation, and accordingly, there is an advantage that a sample value for utilizing in channel estimation may increase and channel estimation performance may be improved.

On the other hand, in the case that "SU dedicated DMRS port combination may be used for MU usage" is indicated/configured, the UE may not assume such an assumption. The UE needs to consider interference due to the DMRS port usable by another UE in channel estimation and consider CDM in time domain and/or frequency domain to remove the interference. In order to estimate a channel corresponding to each DMRS port, a process of removing a channel value for the DMRS port that may act as interference is required, and owing to the process, the number of sample values which may actually utilized for interpolation may decrease. Consequently, owing to the process, degradation may occur in channel estimation performance.

In a multiple TRP transmission situation, the DMRS ports corresponding to different TRPs may correspond to different CDM groups. For example, in the case that the total number of transmission layers is 2, layer #0 that corresponds to TRP #1 may correspond to DMRS port 0 corresponding to CDM group #0, and layer #1 that corresponds to TRP #2 may correspond to DMRS port 2 corresponding to CDM group #1. In the case that the BS is intended to apply multiple TRP transmission, the BS may indicate a DMRS port combination configured with DMRS ports included in different CDM groups. For example, the following examples may be exemplified for the DMRS port combination configured with DMRS ports included in different CDM groups in the DMRS table (e.g., 3gpp TS38.212 Tables 7.3.1.2.2-1/2/3/4) defined in Rel-15.

For Table 7.3.1.2.2-1 corresponding to the case that dmrs-Type=1 and maxLength=1 are configured, values 9, 10, and 11

For Table 7.3.1.2.2-2 corresponding to the case that dmrs-Type=1 and maxLength=2 are configured, values 9, 10, 11, and 30

For Table 7.3.1.2.2-3 corresponding to the case that dmrs-Type=2 and maxLength=1 are configured, values 9, 10, 20, 21, 22, and 23

For Table 7.3.1.2.2-4 corresponding to the case that dmrs-Type=2 and maxLength=2 are configured, values 9, 10, 20, 21, 22, and 23

The characteristics of the DMRS port combinations are that many SU dedicated DMRS port combinations (refer to Table 20) are included therein. Particularly, the case of dmrs-Type=1 is characterized that all DMRS port combinations (DMRS port combinations corresponding values 9, 10, and 11) that may support multiple TRP transmission are SU dedicated DMRS port combinations without regard to the maxLength. Accordingly, there is a disadvantage that when the BS using dmrs-Type=1 schedules multiple TRP transmission on a specific UE, the UE may not schedule data transmission in the same timing to another UE. In addition, even for the case that dmrs-Type=2 is configured, since a part of DMRS port combinations are included in SU dedicated DMRS port combination, a limitation occurs for supporting MU.

Accordingly, the scheme of Proposal 4 may be used as a method for compensating the disadvantage that MU may not be supported when multiple TRP transmission is supported, and there is an advantage that MU is supported even in the case that multiple TRP transmission is supported, and accordingly, cell throughput may be improved. Hereinafter, a method for indicating/configuring that single user (SU) dedicated DMRS port combination may be used for multiple user (MU) usage is described in detail.

SU dedicated DMRS port combination may be configured to be used for MU usage implicitly through DCI. In the case that multiple TCI states are indicated to a UE through a TCI state field in DCI, SU dedicated DMRS port combination in Rel-15 DMRS table (e.g., 3gpp TS38.212 Table 7.3.1.2.2-1/2/3/4) may be used for MU usage. In other words, SU dedicated DMRS port combination may be indicated/configured to be used for MU usage based on the number of TCI states indicated through a TCI field in DCI.

Alternatively, SU dedicated DMRS port combination may be configured to be used for MU usage implicitly through higher layer signaling (e.g., MAC CE). In the case that multiple TCI states are activated in one or more code points among the code points corresponding to TCI field in DCI, in Rel-15 DMRS table, SU dedicated DMRS port combination (refer to Table 20) may be used for MU usage.

For example, in the case that 'value' 9 of Table 7.3.1.2.2-1 is indicated to a specific UE, DMRS port 3 is unable to be used for MU usage previously. However, according to the present proposal, i) in the case that multiple TCI states are indicated to a UE through a TCI state field in DCI or ii) in the case that multiple TCI states are activated in one or more code points among the code points corresponding to TCI field in DCI through higher layer signaling, DMRS port 3 may be additionally used for MU usage. That is, the BS may configure DMRS port 3 to another UE for MU usage, and the UE may assume that DMRS port 3 may be configured to another UE (and/or assume that DMRS port 3 is not SU dedicated).

According to the operation of Proposal 4, whether an operation is performed (i.e., activation/deactivation for whether SU dedicated DMRS port combination is used for MU usage) may be configured through separate higher layer signaling. For example, the operation of Proposal 4 scheme may be activated through higher layer signaling, and i) in the case that multiple TCI states are indicated to a UE through a TCI state field in DCI or ii) in the case that multiple TCI states are activated in one or more code points among the code points corresponding to TCI field in DCI through higher layer signaling, SU dedicated DMRS port combination may be used for MU usage. On the other hand, in the case that the operation is deactivated, the UE may assume SU dedicated DMRS port combination in the same was as previously even in the case of i) or ii).

As another method, the fact that SU dedicated DMRS port combination may be used for MU usage may be indicated/configured through explicit signaling. For example, a specific higher layer parameter and/or a DCI field configuring/indicating that SU dedicated DMRS port combination may be used for MU usage is introduced in Rel-15 DMRS table, and the fact may be explicitly configured. Furthermore, whether the UE can configure a higher layer parameter and/or a DCI field may be configured/determined by UE capability.

Meanwhile, the scheme of Proposal 4 may be limitedly applied to a part of situations. For example, the scheme of Proposal 4 may be limitedly to 1 CW transmission case.

<Proposal 5>

As described above, in the current standard, a DL (downlink) PTRS defines a maximum of 1 port transmission. Particularly, when the UE is scheduled with one codeword), a PTRS port is associated with a DMRS port of the lowest index among scheduled DMRS ports allocated for a PDSCH. When the UE is scheduled with two codewords, the PTRS port is associated with the DMRS port of the lowest index among the DMRS ports allocated for a codeword having a higher MCS. In the case that MCS indexes of two codewords are the same, the PTRS port is associated with the DMRS port of the lowest index allocated for codeword 0. For the DL DMRS port associated with the PTRS port, quasi co-located is assumed in the aspect of {QCL type A and QCL type D}.

However, in the case that multiple-TRP/panel transmission is considered, a phase source may be different between different TRPs/panels, and accordingly, a different PTRS port needs to be defined in each TRP/panel to compensate phase noise influence occurred from different TRPs/panels. Alternatively, in the case of multiple-panel, panels may have the same phase source, and in this case, a single PTRS port is sufficient. As such, even in the case that multiple-TRP/panel transmission is assumed, the number of required PTRS ports may be changed depending on a situation.

Accordingly, in Proposal 5, considering the case that a BS performs multiple-TRP/panel transmission, a method for configuring the number of PTRS ports to a UE is proposed. The number of PTRS ports may be determined based on at least one of (i) the maximum number of DL PTRS ports configurable (configured) to a UE, (ii) the number of TCI states indicated through DCI, or (iii) the number of CDM groups including/corresponding to a DMRS port(s) indicated through DCI.

The BS may configure the maximum number of DL PTRS ports through a higher layer configuration. For example, in the case that the BS performs multiple-TRP/panel transmission, the maximum number of DL PTRS ports may be configured through a higher layer configuration. In one example, as the higher layer configuration, PTRS-DownlinkConfig IE configured through RRC may be used.

An actual number of DL PTRS ports to be transmitted to the UE may be determined based on the number of TCI states indicated to the UE through DCI (this may mean specific code points of TCI state field) and/or the number of CDM groups including the DMRS ports(s) indicated through DCI (this may mean specific entry/code points of DMRS indication field) together with the higher layer configuration (e.g., PTRS-DownlinkConfig). This because the number of TCI states indicated to the UE through DCI or the number of CDM groups including the DMRS ports(s) indicated through DCI may be changed depending on whether it is single-TRP/panel transmission or multiple-TRP/panel transmission.

For example, in the case that the maximum number of DL PTRS ports is configured to 1 to the UE through a higher layer configuration, 1 port PTRS may be transmitted. In the case that the maximum number of DL PTRS ports is configured to a number greater than 1 to the UE, the actual number of DL PTRS ports transmitted to the UE may be determined based on the maximum number of DL PTRS ports configured through a higher layer configuration, the number of TCI states indicated through DCI to the UE, and the number of CDM groups corresponding to a DMRS port(s) indicated through DCI.

For example, in the case that the number of CDM groups including a DMRS port(s) indicated through DCI is 1, the number of DL PTRS ports actually transmitted may correspond to 1, and in the case that the number of CDM groups including a DMRS port(s) indicated through DCI is 2 or greater, the number of DL PTRS ports may be determined to be a minimum value among the maximum number of DL PTRS ports configured to the UE, and/or the number of TCI states indicated through DCI, and/or the number of CDM groups including a DMRS port(s) indicated through DCI.

For example, even in the case that multiple TCI states is indicated, only the DMRS port(s) included in a single CDM group may be indicated, which may mean single-TRP/panel transmission. In this case, a single PTRS port is sufficient, and 1 port PTRS corresponding to minimum value 1 may be transmitted among the maximum number of DL PTRS ports configured through a higher layer configuration, the number of TCI states indicated through DCI, or the number of CDM groups corresponding to a DMRS port(s) indicated through DCI. On the other hand, in the case that multiple TCI states and a DMRS port(s) included in a plurality of CDM groups are indicated, this may mean multiple-TRP/panel transmission. In this case, the number of PTRS ports needs to be defined as many as the number of TRPs/panels of which phase source is different. Accordingly, the number of the PTRS ports may correspond to a minimum value among the maximum number of DL PTRS ports configured to the UE, and/or the number of TCI states indicated through DCI, and/or the number of CDM groups including a DMRS port(s) indicated through DCI.

Meanwhile, the maximum number of DL PTRS ports may be configured for each code-point of a TCI state field in DCI. This is because different TCI state combination may be mapped to each code-point of a TCI field in DCI. For example, each of a code-point corresponding to single-TRP/panel, a code-point corresponding to multiple-TRP/panel with different phase source, and a code-point corresponding to multiple-TRP/panel with the same phase source may be configured. In this case, in order to define/configure the number of PTRS ports optimized for each code-point, different maximum number of DL PTRS ports may be configured for each code-point.

For example, 1 port PTRS may be configured to the code-point corresponding to single-TRP/panel, 2 port PTRS may be configured to the code-point corresponding to multiple-TRP/panel with different phase source, and 1 port PTRS may be configured to the code-point corresponding to multiple-TRP/panel with the same phase source. In order to configure different maximum number of DL PTRS ports for each code-point of a TCI state field in DCI, a method of using MAC CE signaling may be considered.

FIG. 12 illustrates an example of a message (e.g., MAC CE) for activation/deactivation of TCI states for UE-specific PDSCH MAC CE defined in TS38.321.

Referring to FIG. 12, in the message (e.g., MAC CE), T_i is a field indicating activation/deactivation state of TCI state having TCI-StateId i. A bit corresponding to T_i may configured to 0 or 1, and T_i configured to 1 may indicate that the TCI state having TCI-StateId i is activated and corresponds/is mapped to the code-points of a TCI state field in DCI. In order to configure the maximum number of DL PTRS ports corresponding to each code-point, additional bits may be allocated and/or a new message may be defined together with the message of activating the TCI states.

For example, based on information of bitmap format, the maximum number of PTRS ports may be configured for each code-point. The maximum number of DL PTRS ports corresponding to 0 and 1 of bitmap may be predefined. Additional bits for the information of bitmap format may be allocated, or a new message (e.g., MAC CE) may be defined. As a specific example, since 3 bits are allocated to a TCI field of DCI format 1_1, a total of 8 code-points including 000, 001, . . . , and 111 may be present. In the case that a bit is 0 in 8-bit bitmap, in the case that the maximum number of DL PTRS ports is 1, 1, the maximum number of DL PTRS ports may correspond to 2, respectively. In addition, each bit of 8-bit bitmap may correspond to code-points 000, 001, . . . , and 111 of a TCI state field sequentially from LSB or MSB.

Even in the case that different maximum number of DL PTRS ports is configured for each code-point of a TCI state field in DCI, the number of PTRS ports through which PTRS is actually transmitted may be determined according to the number of CDM groups including a DMRS port(s) indicated to the UE through DCI. This is because the number of CDM groups including a DMRS port(s) indicated to the UE through DCI may be changed depending on whether it is single-TRP/panel transmission or multiple-TRP/panel transmission as described above.

For example, even in the case that a code-point of a TCI state field in which the maximum number of PTRS ports is configured to 2 is indicated to the UE, only the DMRS port(s) included in a single CDM group may be indicated, which may means is single-TRP/panel transmission. In this case, a single PTRS port may be sufficient, and 1 port PTRS corresponding to minimum value 1 may be transmitted among the maximum number of DL PTRS ports configured to a code-point of a TCI state field indicated to the UE or the number of CDM groups including a DMRS port(s) indicated through DCI. On the other hand, even in the case that a code-point of a TCI state field in which the maximum number of PTRS ports is configured to 1 is indicated to the UE, the DMRS port(s) included in a plurality of CDM groups may be indicated, which may mean multiple-TRP/panel transmission using the same phase source. Accordingly, even in this case, a single PTRS port may be sufficient, and as the number of PTRS ports actually transmitted, 1 port PTRS corresponding to minimum value 1 may be transmitted among the maximum number of DL PTRS ports configured to a code-point of a TCI state field indicated to the UE or the number of CDM groups including a DMRS port(s) indicated through DCI.

Meanwhile, in the case that a code-point of a TCI state field in which the maximum number of PTRS ports is configured to 2 is indicated to the UE, and in the case that the DMRS port(s) included in a plurality of CDM groups is indicated, which may mean multiple-TRP/panel transmission using different phase sources. Accordingly, in this case, the number of PTRS ports needs to be defined as many as the number of TRPs/panels of which phase source is different, and the number of the PTRS ports may correspond to a minimum value among the maximum number of DL PTRS ports configured to a code-point of a TCI state field indicated to the UE or the number of CDM groups including a DMRS port(s) indicated through DCI.

FIG. 13 shows signaling in the case that a UE receives single DCI (i.e., a single TRP transmits DCI to a UE) in M-TRP (or cell, hereinafter, all TRPs may be substituted by cells, or the case of configuring multiple CORESETs (/CORESET group) from a single TRP may be assumed to be M-TRP) situation. In FIG. 13, the case that TRP 1 is a representative TRP for transmitting DCI is assumed. However, such an assumption is not intended to limit the technical scope of the present disclosure.

Hereinafter, the description is described based on "TRP", but as described above, "TRP" may be substituted and applied by the expression such as a panel, an antenna array, a cell (e.g., macro cell/small cell/pico cell, etc.), a TP (transmission point), a base station (gNB, etc.). In addition, as described above, the TRP may be distinguished according to information (e.g., index or ID) for a CORESET group (or CORESET pool). In one example, in the case that a single UE is configured to perform transmission/reception with multiple TRPs (or cells), this may mean that multiple CORESET groups (or CORESET pools) may be configured for the UE. A configuration for the CORESET group (or CORESET pool) may be performed through higher layer signaling (e.g., RRC signaling).

The UE may receive configuration information for Multiple TRP based transmission/reception through/using TRP 1 (and/or TRP 2) from a Network side (step S1305). That is, the Network side may transmit the configuration information related to Multiple TRP based transmission/reception through/using TRP 1 (and/or TRP 2) to the UE (step S1305). The configuration information may include information related to configuration of network side (i.e., TRP configuration)/resource information (resource allocation) related to Multiple TRP based transmission/reception. The configuration information may be forwarded through higher layer signaling (e.g., RRC signaling, MAC-CE, etc.). In addition, in the case that the configuration information is predefined or preconfigured, the corresponding step may be omitted. For example, the configuration information may include configuration related to TCI state and/or DMRS port or DMRS table/PTRS port described in the method (e.g., Proposals 1/2/3/4/5, etc.) described above.

For example, the operation of the UE (100/200 shown in FIG. 16 to FIG. 20) to receive the configuration information related to Multiple TRP based transmission/reception from the Network side (100/200 shown in FIG. 16 to FIG. 20) of step S1305 described above may be implemented by the apparatus shown in FIG. 16 to FIG. 20 to be described below. For example, referring to FIG. 17, one or more processors 102 may control one or more transceivers 106 and/or one or more memories 104 to receive the configuration information related to Multiple TRP based transmission/reception, and the one or more transceivers 106 may receive the configuration information related to Multiple TRP based transmission/reception from the Network side.

Similarly, the operation of the Network side (100/200 shown in FIG. 16 to FIG. 20) to transmit the configuration information related to Multiple TRP based transmission/reception to the UE (100/200 shown in FIG. 16 to FIG. 20) of step S1305 described above may be implemented by the apparatus shown in FIG. 16 to FIG. 20 to be described below. For example, referring to FIG. 17, one or more processors 102 may control one or more transceivers 106 and/or one or more memories 104 to transmit the configuration information related to Multiple TRP based transmission/reception, and the one or more transceivers 106 may transmit the configuration information related to Multiple TRP based transmission/reception.

The UE may receive DCI, and Data 1 scheduled by the DCI through/using TRP 1 from the Network side (step S1310-1). In addition, the UE may receive Data 2 through/using TRP 2 from the Network side (step S1310-2). That is, the Network side may transmit DCI, and Data 1 scheduled by the DCI through/using TRP 1 to the UE (step S1310-1). In addition, the Network side may transmit Data 2 through/using TRP 2 to the UE (step S1310-2). Here, the DCI may be configured to be used for scheduling both Data 1 and Data 2. In addition, for example, DCI and Data (e.g., Data 1, Data 2) may be transmitted through a control channel (e.g., PDCCH, etc.) and a data channel (e.g., PDSCH), respectively. In addition, step S1310-1 and step S1310-2 may be simultaneously performed, or one of the steps may be performed earlier than the other step.

For example, the DCI may include (indication) information for TCI state, resource allocation information for DMRS and/or data (i.e., space/frequency/time resource) described in the above-described method (e.g., Proposals 1/2/3/4/5, etc.).

For example, the DCI may include i) a transmission configuration indication (TCI) field and ii) an antenna port field. For example, based on the TCI field, a plurality of TCI states may be indicated. In addition, based on the antenna port field, DM-RS ports of a plurality of CDM groups may be indicated. For example, the number of layers associated with each CDM group may be differently configured.

For example, the DCI may include CRC (cyclic redundancy check) scrambled by a specific RNTI (Radio Network Temporary Identifier). In one example, the specific RNTI may be MCS-C-RNTI (modulation coding scheme cell RNTI). That is, the DCI may be associated with MCS-C-RNTI.

For example, the DCI may include information for the maximum number of DL PTRS ports.

In addition, in this case, Data 1 and Data 2 may be transmitted and received based on TCI state/DMRS port/CDM group/layer/PTRS port described in the above-described method (e.g., Proposals 1/2/3/4/5, etc.). For example, the Data 1 and the Data 2 may be received after a specific offset from a reception timing.

For example, the operation of the UE (100/200 shown in FIG. 16 to FIG. 20) to receive the DCI and/or the Data 1 and/or the Data 2 from the Network side (100/200 shown in FIG. 16 to FIG. 20) of steps S1310-1/S1310-2 described above may be implemented by the apparatus shown in FIG. 16 to FIG. 20 to be described below. For example, referring to FIG. 17, one or more processors 102 may control one or more transceivers 106 and/or one or more memories 104 to receive the DCI and/or the Data 1 and/or the Data 2, and the one or more transceivers 106 may receive the DCI and/or the Data 1 and/or the Data 2 from the Network side.

Similarly, the operation of the Network side (100/200 shown in FIG. 16 to FIG. 20) to transmit the DCI and/or the Data 1 and/or the Data 2 to the UE (100/200 shown in FIG. 16 to FIG. 20) of steps S1310-1/S1310-2 described above may be implemented by the apparatus shown in FIG. 16 to FIG. 20 to be described below. For example, referring to FIG. 17, one or more processors 102 may control one or more transceivers 106 and/or one or more memories 104 to transmit the DCI and/or the Data 1 and/or the Data 2, and the one or more transceivers 106 may transmit the DCI and/or the Data 1 and/or the Data 2 to the UE.

The UE may decode the Data 1 and the Data 2 received from TRP 1 and TRP 2 (step S1315). For example, the UE may perform channel estimation and/or decoding the Data based on the above-described method (e.g., Proposals 1/2/3/4/5, etc.).

The UE may know the number of CDM groups and the configuration of DM-RS port corresponding to a value of the antenna port field of the DCI based on the predefined state information (or DMRS port related information) and may decode the Data 1 and the Data 2.

For example, it is assumed that based on the TCI field of the DCI, multiple TCI states are indicated, and based on the antenna port field, DM-RS ports of a plurality of CDM groups are indicated. Based on an indication order of the DMRS ports, orders of a plurality of CDM groups may be determined, and according to the determined orders of the CDM groups, the multiple TCI states may be sequentially corresponded. The first TCI state of the multiple TCI states may correspond to a CDM group including the first DMRS port based on the indication order of the DMRS ports.

In other words, based on the indication order of the DMRS ports, the first TCI state of the plurality of TCI states may correspond to a CDM group of the first DMRS port. In addition, the TCI states except the first TCI state may correspond to other CDM group except the CDM group including the first DMRS port. Accordingly, the DMRS ports included in the CDM group including the first DMRS port may be in QCL (Quasi co location) relation with the reference signal related to the first TCI state.

In still another example, in the case that the DCI is associated with MCS-C-RNTI, the DM-RS ports may correspond to the same DCI state. Based on the condition that URLLC operation and multiple TCI states are indicated to the UE, each TCI state may correspond to a specific resource (e.g., at least one of time resource or frequency resource), and all DMRS ports indicated to the UE may correspond to the same TCI state.

The DM-RS ports may be mapped to layers. For example, regardless of the order in which DMRS ports are indicated, the DMRS ports may be sequentially mapped to the layers based on indexes of the DM-RS ports. Alternatively, the DMRS ports may be sequentially mapped to the layers based on indication orders.

For example, the operation of the UE (100/200 shown in FIG. 16 to FIG. 20) to decode the Data 1 and the Data 2 of step S1315 described above may be implemented by the apparatus shown in FIG. 16 to FIG. 20 to be described below. For example, referring to FIG. 17, one or more processors 102 may control one or more memories 104 to decode the Data 1 and the Data 2.

Based on the proposed method (e.g., Proposal 1/2/3/4/5, etc.), through one or more PUCCH(s), the UE may transmit HARQ-ACK information (e.g., ACK information, NACK information, etc.) for the DCI and/or the Data 1 and/or the Data 2 using/through TRP 1 and/or TRP 2 to the Network side (steps S1320-1 and S1320-2). That is, based on the proposed method (e.g., Proposal 1/2/3/4/5, etc.), the Network side may receive HARQ-ACK information (e.g., ACK information, NACK information, etc.) for the DCI and/or the Data 1 and/or the Data 2 from the UE using/through TRP 1 and/or TRP 2 (steps (S1320-1 and S1320-2).

For example, HARQ-ACK information for the Data 1 and/or the Data 2 may be combined or separated depending on the number of codewords. In addition, the UE may be configured to transmit HARQ-ACK information to a representative TRP (e.g., TRP 1), and HARQ-ACK information transmission to another TRP (e.g., TRP 2) may be omitted.

For example, the operation of the UE (100/200 shown in FIG. 16 to FIG. 20) to transmit HARQ-ACK information for the Data 1 and/or the Data 2 to the Network side (100/200 shown in FIG. 16 to FIG. 20) of steps S1320-1/S1320-2 described above may be implemented by the apparatus shown in FIG. 16 to FIG. 20 to be described below. For example, referring to FIG. 17, one or more processors 102 may control one or more transceivers 106 and/or one or more memories 104 to transmit HARQ-ACK information for the Data 1 and/or the Data 2, and the one or more transceivers 106 to transmit HARQ-ACK information for the Data 1 and/or the Data 2 to the Network side through one or more PUCCHs.

Similarly, the operation of the Network side (100/200 shown in FIG. 16 to FIG. 20) to receive HARQ-ACK information for the Data 1 and/or the Data 2 from the UE (100/200 shown in FIG. 16 to FIG. 20) of steps S1320-1/S1320-2 described above may be implemented by the apparatus shown in FIG. 16 to FIG. 20 to be described below. For example, referring to FIG. 17, one or more processors 102 may control one or more transceivers 106 and/or one or more memories 104 to receive HARQ-ACK information for the Data 1 and/or the Data 2, and the one or more transceivers 106 may receive HARQ-ACK information for the Data 1 and/or the Data 2 from the UE through one or more PUCCHs.

In FIG. 13, the single DCI based M-TRP operation is mainly described but may be applied to the multiple-DCI based M-TRP operation in some cases.

FIG. 14 illustrates an example of PTRS reception operation flowchart of a User Equipment (UE) to which the method (e.g., Proposal 1/2/3/4/5, etc.) proposed in the present disclosure may be applied. The UE may be supported by multiple TRPs, and ideal/non-ideal backhaul may be configured among the multiple TRPs. FIG. 14 is shown just for the convenience of description, and not intended to limit the scope of the present disclosure. Furthermore, a part of step(s) shown in FIG. 14 may be omitted depending on a situation and/or configuration.

Hereinafter, the description is described based on "TRP", but as described above, "TRP" may be substituted and applied by the expression such as a panel, an antenna array, a cell (e.g., macro cell/small cell/pico cell, etc.), a TP (transmission point), a base station (gNB, etc.). In addition, as described above, the TRP may be distinguished according to information (e.g., index or ID) for a CORESET group (or CORESET pool). In one example, in the case that a single UE is configured to perform transmission/reception with multiple TRPs (or cells), this may mean that multiple CORESET groups (or CORESET pools) may be configured for the UE. A configuration for the CORESET group (or CORESET pool) may be performed through higher layer signaling (e.g., RRC signaling).

The UE may receive Downlink Control Information (DCI) (step S1410). The DCI may be transmitted through a control channel (e.g., PDCCH).

The DCI may include i) a transmission configuration indication (TCI) field and ii) an antenna port field. For example, based on the TCI field, a plurality of TCI states may be indicated. In addition, based on the antenna port field, DM-RS ports of a plurality of CDM groups may be indicated. For example, the number of layers associated with each CDM group may be differently configured.

For example, a plurality of state information related to a combination of the CDM group and the DMRS port may be predefined, and specific state information (or value) among the plurality of state information may be indicated through the antenna port field of DCI. In one example, the state information may mean DMRS port related information (e.g., 3gpp TS38.212 Table 7.3.1.2.2-1/2/3/4, etc.).

For example, the DCI may include CRC (cyclic redundancy check) scrambled by a specific RNTI (Radio Network Temporary Identifier). In one example, the specific RNTI may be MCS-C-RNTI (modulation coding scheme cell RNTI). That is, the DCI may be associated with MCS-C-RNTI. In one example, in the case that the UE receives the DCI including CRC scrambled by MCS-C-RNTI, the UE may identify that URLLC operation is performed from the BS (or multiple MTRPs).

For example, based on the number of TCI states indicated through a TCI field in the DCI, it may be indicated/configured that single-user (UE) dedicated DMRS port combination may be used for multiple-user (UE) usage. Alternatively, in the case that a plurality of TCI states is activated on one or more code points among the code points corresponding to a TCI state field in the DCI, it may be indicated/configured that single-user (UE) dedicated DMRS port combination may be used for multiple-user (UE) usage. Accordingly, information representing that single-UE dedicated DMRS ports may be used by another UE (i.e., whether SU dedicated DMRS port combination is operable for MU usage (whether it is activated)) may be received through higher layer signaling.

For example, the operation of the UE (100/200 shown in FIG. 16 to FIG. 20) to receive DL control information of step S1420 described above may be implemented by the apparatus shown in FIG. 16 to FIG. 20 to be described below. For example, referring to FIG. 17, one or more processors 102 may control one or more transceivers 106 and/or one or more memories 104 to receive the DCI, and the one or more transceivers 106 may receive the DCI.

The UE may receive a Physical downlink shared channel (PDSCH) scheduled based on the DCI (step S1420). In addition, the UE may decode the PDSCH. For example, the PDSCH may be received after a specific offset from the reception timing of the DCI. For example, the procedure of receiving and decoding the PDSCH may be performed based on the proposed method (e.g., Proposal 1/2/3/4/5, etc.). The UE may know the number of CDM groups and the configuration of the DMRS port that correspond to the antenna port field of the DCI and may decode the PDSCH.

For example, it is assumed that based on the TCI field, multiple TCI states are indicated, and based on the antenna port related information, DMRS ports of a plurality of CDM groups are indicated. Based on an indication order of the DMRS ports, orders of a plurality of CDM groups may be determined, and according to the determined orders of the CDM groups, the multiple TCI states may be sequentially corresponded. The first TCI state of the multiple TCI states may correspond to a CDM group including the first DMRS port based on the indication order of the DMRS ports.

In other words, based on the indication order of the DMRS ports, the first TCI state of the plurality of TCI states may correspond to a CDM group of the first DMRS port. In addition, the TCI states except the first TCI state may correspond to other CDM group except the CDM group including the first DMRS port. Accordingly, the DMRS ports included in the CDM group including the first DMRS port may be in QCL (Quasi co location) relation with the reference signal related to the first TCI state.

For example, the mapping scheme of the TCI state may applied to the case that two codewords are transmitted/received as well as the case that one codeword is transmitted/received through the data channel.

In still another example, in the case that the DCI is associated with MCS-C-RNTI, the DM-RS ports may correspond to the same DCI state. Based on the condition that URLLC operation and multiple TCI states are indicated to the UE, each TCI state may correspond to a specific resource (e.g., at least one of time resource or frequency resource), and all DMRS ports indicated to the UE may correspond to the same TCI state.

The DMRS ports may be mapped to layers. For example, regardless of the order in which DMRS ports are indicated, the DMRS ports may be sequentially mapped to the layers based on indexes of the DM-RS ports. Alternatively, the DMRS ports may be sequentially mapped to the layers based on indication orders.

In addition, in the case that the data channel includes two codewords, the number of DMRS ports of the CDM group including the first DMRS port and the number of DMRS ports of the other CDM group may be determined to be a specific number based on the total number of layers.

For example, based on the condition that URLLC operation and multiple TCI states are indicated to the UE, the UE may decode a PDSCH based on specific DMRS port related information. The specific DMRS port related information may be 3gpp TS38.212 Table 7.3.1.2.2-1/2/3/4. Alternatively, a DMRS table configured with a subset of 3gpp TS38.212 Table 7.3.1.2.2-1/2/3/4 may be defined, and the UE may decode a PDSCH based on the subset. The subset may be configured except a DMRS port combination for the number of layers that exceeds a specific number of layers. In addition, a bit width for indicating the subset may be narrower than the conventional bit width, and the reduced bit width may be used for indicating URLLC operation scheme (e.g., SDM, FDM, or TDM).

For example, the operation of the UE (100/200 shown in FIG. 16 to FIG. 20) to receive the PDSCH of step S1420 described above may be implemented by the apparatus shown in FIG. 16 to FIG. 20 to be described below. For example, referring to FIG. 17, one or more processors 102 may control one or more transceivers 106 and/or one or more memories 104 to receive the PDSCH, and the one or more transceivers 106 may receive the PDSCH.

Although it is not shown in FIG. 14, the UE may also receive the configuration information. The configuration information may be received through higher layer signaling (e.g., RRC or MAC CE, etc.). In addition, the operation of receiving the configuration information may be performed before the operation of receiving the DCI of step S1410.

For example, the configuration information may include information of configuring such that a DMRS port combination used for single-user is also used for multiple-user among the predefined DMRS port related information. Alternatively, the configuration information may include a configuration for URLLC transmission. In one example, the configuration information may include a parameter (e.g., pdsch-AggregationFactor) related to a repetition number of the data, and URLLC transmission may be configured based on the parameter.

FIG. 15 illustrates an example of data transmission/reception operation flowchart of a Base Station (BS) to which the methods (e.g., Proposal 1/2/3/4/5, etc.) proposed in the present disclosure may be applied. FIG. 15 is shown just for the convenience of description, and not intended to limit the scope of the present disclosure. Furthermore, a part of step(s) shown in FIG. 15 may be omitted depending on a situation and/or configuration.

The BS may collectively mean an object that performs data transmission/reception with the UE. For example, the BS may include one or more TPs (Transmission Points), one or more TRPs (Transmission and Reception Points), and the like. Furthermore, the TP and/or TRP may include a panel, a transmission and reception unit, and the like of the BS. In addition, as described above, the TRP may be distinguished according to information (e.g., index or ID) for a CORESET group (or CORESET pool). In one example, in the case that a single UE is configured to perform transmission/reception with multiple TRPs (or cells), this may mean that multiple CORESET groups (or CORESET pools) may be configured for the UE. A configuration for the CORESET group (or CORESET pool) may be performed through higher layer signaling (e.g., RRC signaling).

The BS may transmit the configuration information (step S1510). The configuration information may be received through higher layer signaling (e.g., RRC or MAC CE, etc.). The configuration information may include the DMRS related configuration, the TCI state related configuration, and the like.

For example, the configuration information may include information of configuring such that a DMRS port combination used for single-user is also used for multiple-user among the predefined DMRS port related information. Alternatively, the configuration information may include a configuration for URLLC transmission. In one example, the configuration information may include a parameter (e.g., pdsch-AggregationFactor) related to a repetition number of the data, and URLLC transmission may be configured based on the parameter.

For example, the operation of the BS (100/200 shown in FIG. 16 to FIG. 20) to transmit the configuration information of step S1510 described above may be implemented by the apparatus shown in FIG. 16 to FIG. 20 to be described below. For example, referring to FIG. 17, one or more processors 102 may control one or more transceivers 106 and/or one or more memories 104 to transmit the configuration information, and the one or more transceivers 106 may transmit the configuration information.

The BS may transmit Downlink Control Information (DCI) to the UE (step S1520). The DCI may be transmitted through a control channel (e.g., PDCCH).

The DCI may include i) a transmission configuration indication (TCI) field and ii) an antenna port field. For example, based on the TCI field, a plurality of TCI states may be indicated. In addition, based on the antenna port field, DM-RS ports of a plurality of CDM groups may be indicated. For example, the number of layers associated with each CDM group may be differently configured.

For example, based on an indication order of the DMRS ports, orders of a plurality of CDM groups may be determined, and according to the determined orders of the CDM groups, the multiple TCI states may be sequentially corresponded. The first TCI state of the multiple TCI states may correspond to a CDM group including the first DMRS port based on the indication order of the DMRS ports.

In other words, based on the indication order of the DMRS ports, the first TCI state of the plurality of TCI states may correspond to a CDM group of the first DMRS port. In addition, the TCI states except the first TCI state may correspond to other CDM group except the CDM group including the first DMRS port. Accordingly, the DMRS ports included in the CDM group including the first DMRS port may be in QCL (Quasi co location) relation with the reference signal related to the first TCI state.

For example, a plurality of state information related to a combination of the CDM group and the DMRS port may be predefined, and specific state information (or value) among the plurality of state information may be indicated through the antenna port field of DCI. For example, the BS may configure the number of CDM groups and the configuration of the DMRS port related to encoding of the PDSCH through a value of the antenna port field of the DCI.

For example, the DCI may include CRC (cyclic redundancy check) scrambled by a specific RNTI (Radio Network Temporary Identifier). In one example, the specific RNTI may be MCS-C-RNTI (modulation coding scheme cell RNTI). In one example, in the case that the BS may transmit the DCI including CRC scrambled by MCS-C-RNTI to the UE to configure URLLC operation.

For example, based on the number of TCI states indicated through a TCI field in the DCI, it may be indicated/configured that single-user (UE) dedicated DMRS port combination may be used for multiple-user (UE) usage. Alternatively, in the case that a plurality of TCI states is activated on one or more code points among the code points corresponding to a TCI state field in the DCI, it may be indicated/configured that single-user (UE) dedicated DMRS port combination may be used for multiple-user (UE) usage.

For example, the operation of the BS (100/200 shown in FIG. 16 to FIG. 20) to transmit DL control information of step S1520 described above may be implemented by the apparatus shown in FIG. 16 to FIG. 20 to be described below. For example, referring to FIG. 17, one or more processors 102 may control one or more transceivers 106 and/or one or more memories 104 to transmit the DCI, and the one or more transceivers 106 may transmit the DCI to the UE.

The BS may transmit the Physical downlink shared channel (PDSCH) to the UE (step S1530). For example, the procedure that the BS encodes and transmits the PDSCH to the UE may be performed based on the proposed method (e.g., Proposal 1/2/3/4/5, etc.).

For example, the PDSCH may be mapped to layers and transmitted. For example, regardless of the order in which DMRS ports are indicated, the DMRS ports may be sequentially mapped to the layers based on indexes of the DM-RS ports. In addition, the PDSCH may be transmitted according to the DMRS port related configuration/indication of the proposed method (e.g., Proposal 1/2/3/4/5, etc.).

For example, the operation of the BS (100/200 shown in FIG. 16 to FIG. 20) to transmit the PDSCH to the UE of step S1430 described above may be implemented by the apparatus shown in FIG. 16 to FIG. 20 to be described below. For example, referring to FIG. 17, one or more processors 102 may control one or more transceivers 106 and/or one or more memories 104 to transmit the PDSCH, and the one or more transceivers 106 may transmit the PDSCH to the UE.

As described above, the Network side/UE signaling and the operation (e.g., Proposal 1/2/3/4/5, FIG. 13, FIG. 15, etc.) described above may be implemented by the apparatus (e.g., FIG. 16 to FIG. 20) to be described below. For example, the Network side (e.g., TRP 1/TRP 2) may correspond to a first wireless apparatus, and the UE may correspond to a second wireless apparatus. In some cases, the opposite case may also be considered. For example, the first apparatus (e.g., TRP 1 and the second apparatus (e.g., TRP 2) may correspond to a first wireless apparatus, and the UE may correspond to a second wireless apparatus. In some cases, the opposite case may also be considered.

For example, the Network side/UE signaling and the operation (e.g., Proposal 1/2/3/4/5, FIG. 13, FIG. 15, etc.) described above may be processed by one or more processors (e.g., 102 and 202), and the Network side/UE signaling and the operation (e.g., Proposal 1/2/3/4/5, FIG. 13, FIG. 15, etc.) described above may be stored in one or memories (e.g., 104 and 204) in a command/program (e.g., instruction, executable code) form to drive one or more processors (e.g., 102 and 202) shown in FIG. 16 to FIG. 20.

Example of Communication System to which Present Disclosure is Applied

Although not limited thereto, but various descriptions, functions, procedures, proposals, methods, and/or operation flowcharts of the present disclosure, which are disclosed in this document may be applied to various fields requiring wireless communications/connections (e.g., 5G) between devices.

Hereinafter, the communication system will be described in more detail with reference to drawings. In the following drawings/descriptions, the same reference numerals will refer to the same or corresponding hardware blocks, software blocks, or functional blocks if not differently described.

FIG. 16 illustrates a communication system applied to the present disclosure.

Referring to FIG. 16, a communication system 1 applied to the present disclosure includes a wireless device, a BS, and a network. Here, the wireless device may mean a device that performs communication by using a wireless access technology (e.g., 5G New RAT (NR) or Long Term Evolution (LTE)) and may be referred to as a communication/wireless/5G device. Although not limited thereto, the wireless device may include a robot 100*a*. vehicles 100*b*-1 and 100*b*-2, an eXtended Reality (XR) device 100*c*, a hand-held device 100*d*, a home appliance 100*e*, an Internet of Thing (IoT) device 100*f*, and an AI device/server 400. For example, the vehicle may include a vehicle with a wireless communication function, an autonomous driving vehicle, a vehicle capable of performing inter-vehicle communication, and the like. Here, the vehicle may include an Unmanned Aerial Vehicle (UAV) (e.g., drone). The XR device may include an Augmented Reality (AR)/Virtual Reality (VR)/Mixed Reality (MR) device and may be implemented as a form such as a head-mounted device (HMD), a head-up display (HUD) provided in the vehicle, a television, a smart phone, a computer, a wearable device, a home appliance device, digital signage, a vehicle, a robot, etc. The hand-held device may include the smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the BS and the network may be implemented even the wireless device and a specific wireless device 200a may operate an eNB/network node for another wireless device.

The wireless devices 100a to 100f may be connected to a network 300 through a BS 200. An artificial intelligence (AI) technology may be applied to the wireless devices 100a to 100f and the wireless devices 100a to 100f may be connected to an AI server 400 through the network 300. The network 300 may be configured by using a 3G network, a 4G (e.g., LTE) network, or a 5G (e.g., NR) network. The wireless devices 100a to 100f may communicate with each other through the BS 200/network 300, but may directly communicate with each other without going through the BS/network (sidelink communication). For example, the vehicles 100b-1 and 100b-2 may perform direct communication (e.g., Vehicle to Vehicle (V2V)/Vehicle to everything (V2X) communication). Further, the IoT device (e.g., sensor) may perform direct communication with other IoT devices (e.g., sensor) or other wireless devices 100a to 100f.

Wireless communications/connections 150a, 150b, and 150c may be made between the wireless devices 100a to 100f and the BS 200 and between the BS 200 and the BS 200. Here, the wireless communication/connection may be made through various wireless access technologies (e.g., 5G NR) such as uplink/downlink communication 150a, sidelink communication 150b (or D2D communication), and inter-BS communication 150c (e.g., relay, Integrated Access Backhaul (IAB). The wireless device and the BS/the wireless device and the BS and the BS may transmit/receive radio signals to/from each other through wireless communications/connections 150a, 150b, and 150c. For example, the wireless communications/connections 150a, 150b, and 150c may transmit/receive signals through various physical channels. To this end, based on various proposals of the present disclosure, at least some of various configuration information setting processes, various signal processing processes (e.g., channel encoding/decoding, modulation/demodulation, resource mapping/demapping, etc.), a resource allocation process, and the like for transmission/reception of the radio signal may be performed.

Example of Wireless Device to which Present Disclosure is Applied

FIG. 17 illustrates a wireless device which may be applied to the present disclosure.

Referring to FIG. 17, a first wireless device 100 and a second wireless device 200 may transmit/receive radio signals through various wireless access technologies (e.g., LTE and NR). Here, the first wireless device 100 and the second wireless device 200 may correspond to a wireless device 100x and a BS 200 and/or a wireless device 100x and a wireless device 100x of FIG. 16.

The first wireless device 100 may include one or more processors 102 and one or more memories 104 and additionally further include one or more transceivers 106 and/or one or more antennas 108. The processor 102 may control the memory 104 and/or the transceiver 106 and may be configured to implement descriptions, functions, procedures, proposals, methods, and/or operation flows disclosed in the present disclosure. For example, the processor 102 may process information in the memory 104 and generate a first information/signal and then transmit a radio signal including the first information/signal through the transceiver 106. Further, the processor 102 may receive a radio signal including a second information/signal through the transceiver 106 and then store in the memory 104 information obtained from signal processing of the second information/signal. The memory 104 may connected to the processor 102 and store various information related to an operation of the processor 102. For example, the memory 104 may store a software code including instructions for performing some or all of processes controlled by the processor 102 or performing the descriptions, functions, procedures, proposals, methods, and/or operation flowcharts disclosed in the present disclosure. Here, the processor 102 and the memory 104 may be a part of a communication modem/circuit/chip designated to implement the wireless communication technology (e.g., LTE and NR). The transceiver 106 may be connected to the processor 102 and may transmit and/or receive the radio signals through one or more antennas 108. The transceiver 106 may include a transmitter and/or a receiver. The transceiver 106 may be used mixedly with a radio frequency (RF) unit. In the present disclosure, the wireless device may mean the communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement descriptions, functions, procedures, proposals, methods, and/or operation flows disclosed in the present disclosure. For example, the processor 202 may process information in the memory 204 and generate a third information/signal and then transmit a radio signal including the third information/signal through the transceiver 206. Further, the processor 202 may receive a radio signal including a fourth information/signal through the transceiver 206 and then store in the memory 204 information obtained from signal processing of the fourth information/signal. The memory 204 may connected to the processor 202 and store various information related to an operation of the processor 202. For example, the memory 204 may store a software code including instructions for performing some or all of processes controlled by the processor 202 or performing the descriptions, functions, procedures, proposals, methods, and/or operation flowcharts disclosed in the present disclosure. Here, the processor 202 and the memory 204 may be a part of a communication modem/circuit/chip designated to implement the wireless communication technology (e.g., LTE and NR). The transceiver 206 may be connected to the processor 202 and may transmit and/or receive the radio signals through one or more antennas 208. The transceiver 206 may include a transmitter and/or a receiver and the transceiver 206 may be mixed with the RF unit. In the present disclosure, the wireless device may mean the communication modem/circuit/chip.

Hereinafter, hardware elements of the wireless devices 100 and 200 will be described in more detail. Although not limited thereto, one or more protocol layers may be implemented by one or more processors 102 and 202. For example, one or more processors 102 and 202 may implement one or more layers (e.g., functional layers such as PHY, MAC, RLC, PDCP, RRC, and SDAP). One or more processors 102 and 202 may generate one or more protocol data units (PDUs) and/or one or more service data units (SDUs) according to the descriptions, functions, procedures, proposals, methods, and/or operation flowcharts disclosed in the present disclosure. One or more processors 102 and 202 may generate a message, control information, data, or information according to the descriptions, functions, procedures, proposals, methods, and/or operation flowcharts disclosed in the present disclosure. One or more processors 102 and 202 may generate a signal (e.g., a baseband signal) including the PDU, the SDU, the message, the control information, the data, or the information according to the function, the procedure, the proposal, and/or the method disclosed in the present disclosure and provide the generated signal to one or more transceivers 106 and 206. One or more processors 102 and 202 may receive the signal (e.g., baseband signal) from one or more transceivers 106 and 206 and acquire the PDU, the SDU, the message, the control information, the data, or the information according to the descriptions, functions, procedures, proposals, methods, and/or operation flowcharts disclosed in the present disclosure.

One or more processors 102 and 202 may be referred to as a controller, a microcontroller, a microprocessor, or a microcomputer. One or more processors 102 and 202 may be implemented by hardware, firmware, software, or a combination thereof. As one example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 102 and 202. The descriptions, functions, procedures, proposals, and/or operation flowcharts disclosed in the present disclosure may be implemented by using firmware or software and the firmware or software may be implemented to include modules, procedures, functions, and the like. Firmware or software configured to perform the descriptions, functions, procedures, proposals, and/or operation flowcharts disclosed in the present disclosure may be included in one or more processors 102 and 202 or stored in one or more memories 104 and 204 and driven by one or more processors 102 and 202. The descriptions, functions, procedures, proposals, and/or operation flowcharts disclosed in the present disclosure may be implemented by using firmware or software in the form of a code, the instruction and/or a set form of the instruction.

One or more memories 104 and 204 may be connected to one or more processors 102 and 202 and may store various types of data, signals, messages, information, programs, codes, instructions, and/or commands. One or more memories 104 and 204 may be configured by a ROM, a RAM, an EPROM, a flash memory, a hard drive, a register, a cache memory, a computer reading storage medium, and/or a combination thereof. One or more memories 104 and 204 may be positioned inside and/or outside one or more processors 102 and 202. Further, one or more memories 104 and 204 may be connected to one or more processors 102 and 202 through various technologies such as wired or wireless connection.

One or more transceivers 106 and 206 may transmit to one or more other devices user data, control information, a wireless signal/channel, etc., mentioned in the methods and/or operation flowcharts of the present disclosure. One or more transceivers 106 and 206 may receive from one or more other devices user data, control information, a wireless signal/channel, etc., mentioned in the descriptions, functions, procedures, proposals, methods, and/or operation flowcharts disclosed in the present disclosure. For example, one or more transceivers 106 and 206 may be connected to one or more processors 102 and 202 and transmit and receive the radio signals. For example, one or more processors 102 and 202 may control one or more transceivers 106 and 206 to transmit the user data, the control information, or the radio signal to one or more other devices. Further, one or more processors 102 and 202 may control one or more transceivers 106 and 206 to receive the user data, the control information, or the radio signal from one or more other devices. Further, one or more transceivers 106 and 206 may be connected to one or more antennas 108 and 208 and one or more transceivers 106 and 206 may be configured to transmit and receive the user data, control information, wireless signal/channel, etc., mentioned in the descriptions, functions, procedures, proposals, methods, and/or operation flowcharts disclosed in the present disclosure through one or more antennas 108 and 208. In the present disclosure one or more antennas may be a plurality of physical antennas or a plurality of logical antennas (e.g., antenna ports). One or more transceivers 106 and 206 may convert the received radio signal/channel from an RF band signal to a baseband signal in order to process the received user data, control information, radio signal/channel, etc., by using one or more processors 102 and 202. One or more transceivers 106 and 206 may convert the user data, control information, radio signal/channel, etc., processed by using one or more processors 102 and 202, from the baseband signal into the RF band signal. To this end, one or more transceivers 106 and 206 may include an (analog) oscillator and/or filter.

Example of Signal Processing Circuit to which Present Disclosure is Applied

FIG. 18 illustrates a signal processing circuit for a transmit signal.

Referring to FIG. 18 a signal processing circuit 1000 may include a scrambler 1010, a modulator 1020, a layer mapper 1030, a precoder 1040, a resource mapper 1050, and a signal generator 1060. Although not limited thereto, an operation/function of FIG. 18 may be performed by the processors 102 and 202 and/or the transceivers 106 and 206 of FIG. 17. Hardware elements of FIG. 18 may be implemented in the processors 102 and 202 and/or the transceivers 106 and 206 of FIG. 17. For example, blocks 1010 to 1060 may be implemented in the processors 102 and 202 of FIG. 17. Further, blocks 1010 to 1050 may be implemented in the processors 102 and 202 of FIG. 17 and the block 1060 may be implemented in the transceivers 106 and 206 of FIG. 17.

A codeword may be transformed into a radio signal via the signal processing circuit 1000 of FIG. 18. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-Binary Phase Shift Keying (pi/2-BPSK), m-Phase Shift Keying (m-PSK), m-Quadrature Amplitude Modulation (m-QAM), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource.

The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) insertor, a Digital-to-Analog Converter (DAC), a frequency uplink converter, and the like.

A signal processing process for a receive signal in the wireless device may be configured in the reverse of the signal processing process (1010 to 1060) of FIG. 18. For example, the wireless device (e.g., 100 or 200 of FIG. 17) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Utilization Example of Wireless Device to which Present Disclosure is Applied

FIG. 19 illustrates another example of a wireless device applied to the present disclosure. The wireless device may be implemented as various types according to a use example/service (see FIG. 16).

Referring to FIG. 19, wireless devices 100 and 200 may correspond to the wireless devices 100 and 200 of FIG. 17 and may be constituted by various elements, components, units, and/or modules. For example, the wireless devices 100 and 200 may include a communication unit 110, a control unit 120, and a memory unit 130, and an additional element 140. The communication unit may include a communication circuit 112 and a transceiver(s) 114. For example, the communication circuit 112 may include one or more processors 102 and 202 and/or one or more memories 104 and 204 of FIG. 17. For example, the transceiver(s) 114 may include one or more transceivers 106 and 206 and/or one or more antennas 108 and 208 of FIG. 17. The control unit 120 is electrically connected to the communication unit 110, the memory unit 130, and the additional element 140 and controls an overall operation of the wireless device. For example, the control unit 120 may an electrical/mechanical operation of the wireless device based on a program/code/instruction/information stored in the memory unit 130. Further, the control unit 120 may transmit the information stored in the memory unit 130 to the outside (e.g., other communication devices) through the communication unit 110 via a wireless/wired interface or store information received from the outside (e.g., other communication devices) through the wireless/wired interface through the communication unit 110.

The additional element 140 may be variously configured according to the type of wireless device. For example, the additional element 140 may include at least one of a power unit/battery, an input/output (I/O) unit, a driving unit, and a computing unit. Although not limited thereto, the wireless device may be implemented as a form such as the robot 100a of FIG. 16, the vehicles 100b-1 and 100b-2 of FIG. 16, the XR device 100c of FIG. 16, the portable device 100d of FIG. 16, the home appliance 100e of FIG. 16, the IoT device 100f of FIG. 16, a digital broadcasting terminal, a hologram device, a public safety device, an MTC device, a medical device, a fintech device (or financial device), a security device, a climate/environment device, an AI server/device 400 of FIG. 16, the BS 200 of FIG. 16, a network node, etc. The wireless device may be movable or may be used at a fixed place according to a use example/service.

In FIG. 19, all of various elements, components, units, and/or modules in the wireless devices 100 and 200 may be interconnected through the wired interface or at least may be wirelessly connected through the communication unit 110. For example, the control unit 120 and the communication 110 in the wireless devices 100 and 200 may be wiredly connected and the control unit 120 and the first unit (e.g., 130 or 140) may be wirelessly connected through the communication unit 110. Further, each element, component, unit, and/or module in the wireless devices 100 and 200 may further include one or more elements. For example, the control unit 120 may be constituted by one or more processor sets. For example, the control unit 120 may be configured a set of a communication control processor, an application processor, an electronic control unit (ECU), a graphic processing processor, a memory control processor, etc. As another example, the memory 130 may be configured as a random access memory (RAM), a dynamic RAM (DRAM), a read only memory (ROM), a flash memory, a volatile memory, a non-volatile memory, and/or combinations thereof.

Example of Hand-Held Device to which Present Disclosure is Applied

FIG. 20 illustrates a hand-held device applied to the present disclosure. The hand-held device may include a smart phone, a smart pad, a wearable device (e.g., a smart watch, a smart glass), and a hand-held computer (e.g., a notebook, etc.). The hand-held device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 20, a hand-held device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 19, respectively.

The communication unit 110 may transmit/receive a signal (e.g., data, a control signal, etc.) to/from another wireless device and BSs. The control unit 120 may perform various operations by controlling components of the hand-held device 100. The control unit 120 may include an Application Processor (AP). The memory unit 130 may store data/parameters/programs/codes/instructions required for driving the hand-held device 100. Further, the memory unit 130 may store input/output data/information, etc. The power supply unit 140a may supply power to the hand-held device 100 and include a wired/wireless charging circuit, a battery, and the like. The interface unit 140b may support a connection between the hand-held device 100 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although a method of transmitting and receiving PDSCH in a wireless communication system of the present disclosure has been described with reference to an example applied to a 3GPP LTE/LTE-A system or a 5G system (New RAT system), the scheme may be applied to various wireless communication systems in addition to the 3GPP LTE/LTE-A system or 5G system.

The invention claimed is:

1. A method performed by a user equipment (UE) in a wireless communication system, the method comprising:
    receiving downlink control information (DCI) including
        i) a transmission configuration indication (TCI) field and ii) an antenna port field,
    wherein an entry related to one or more Code Division Multiplexing (CDM) groups and one or more DeModulation Reference Signal (DMRS) ports is indicated based on the antenna port field; and
    receiving a phase tracking reference signal (PTRS) based on one or more PTRS ports,
    wherein a number of the one or more PTRS ports is based on at least one of i) a number of one or more TCI states based on the TCI field, ii) the number of the one or more CDM groups, or iii) a configured value of a maximum value of the number of the one or more PTRS ports, and
    wherein, based on i) the number of the one or more TCI states being 2 and ii) the number of the one or more CDM groups being 2:
        a number of DMRS ports related to a first CDM group is 1,
        a number of DMRS ports related to a second CDM group is 2, and
        the first CDM group includes a DMRS port 0 among the one or more DMRS ports based on the entry.

2. The method of claim 1,
    wherein the configured value of the maximum value of the number of the one or more PTRS ports is 1 or 2.

3. The method of claim 1,
    wherein, based on i) the number of the one or more TCI states being 2, ii) the number of the one or more CDM groups being 2, and iii) the configured value of the maximum value being 2, the number of the one or more PTRS ports.

4. The method of claim 1, further comprising:
    receiving, from a base station, configuration information including information for the maximum value.

5. The method of claim 4,
    wherein the configured value of the maximum value is determined based on the information for the maximum value.

6. The method of claim 1,
    wherein, based on i) the number of the one or more TCI states being 2 and ii) the number of the one or more CDM groups being 1, the number of the one or more PTRS ports is 1.

7. The method of claim 1,
    wherein, based on i) the number of the one or more TCI states being 2, ii) the number of the one or more CDM groups being 1, and iii) the configured value of the maximum value being 2, the number of the one or more PTRS ports is 1.

8. A user equipment (UE) configured to receive a phase tracking reference signal (PTRS) in a wireless communication system, the UE comprising:

one or more transceivers;

one or more processors; and one or more memories for storing instructions causing, when executed, the one or more processors to perform operations comprising:

receiving downlink control information (DCI) including i) a transmission configuration indication (TCI) field and ii) an antenna port field, wherein an entry related to one or more Code Division Multiplexing (CDM) groups and one or more DeModulation Reference Signal (DMRS) ports is indicated based on the antenna port field; and receiving a phase tracking reference signal (PTRS) based on one or more PTRS ports, wherein a number of the one or more PTRS ports is based on at least one of i) a number of one or more TCI states based on the TCI field, ii) the number of the one or more CDM groups, or iii) a configured value of a maximum value of the number of the one or more PTRS ports, and wherein, based on i) the number of the one or more TCI states being 2 and ii) the number of the one or more CDM groups being 2:
- a number of DMRS ports related to a first CDM group is 1,
- a number of DMRS ports related to a second CDM group is 2, and
- the first CDM group includes a DMRS port 0 among the one or more DMRS ports based on the entry.

9. A base station comprising:

one or more transceivers;

one or more processors; and one or more memories for storing instructions causing, when executed, the one or more processors to perform operations comprising:

transmitting downlink control information (DCI) including i) a transmission configuration indication (TCI) field and ii) an antenna port field, wherein an entry related to one or more Code Division Multiplexing (CDM) groups and one or more DeModulation Reference Signal (DMRS) ports is indicated based on the antenna port field; and transmitting a phase tracking reference signal (PTRS) based on one or more PTRS ports, wherein a number of the one or more PTRS ports is based on at least one of i) a number of one or more TCI states based on the TCI field, ii) the number of the one or more CDM groups, or iii) a configured value of a maximum value of the number of the one or more PTRS ports, and wherein, based on i) the number of the one or more TCI states being 2 and ii) the number of the one or more CDM groups being 2:
- a number of DMRS ports related to a first CDM group is 1,
- a number of DMRS ports related to a second CDM group is 2, and
- the first CDM group includes a DMRS port 0 among the one or more DMRS ports based on the entry.

* * * * *